US009516596B2

United States Patent
Kusakabe

(10) Patent No.: US 9,516,596 B2
(45) Date of Patent: Dec. 6, 2016

(54) APPARATUS AND METHOD

(71) Applicant: CANON KABUSHIKI KAISHA, Tokyo (JP)

(72) Inventor: Taketoshi Kusakabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 14/375,861

(22) PCT Filed: Feb. 27, 2013

(86) PCT No.: PCT/JP2013/056044
§ 371 (c)(1),
(2) Date: Jul. 31, 2014

(87) PCT Pub. No.: WO2013/133293
PCT Pub. Date: Sep. 12, 2013

(65) Prior Publication Data
US 2015/0327172 A1   Nov. 12, 2015

(30) Foreign Application Priority Data
Mar. 5, 2012   (JP) ................ 2012-048615

(51) Int. Cl.
*H04W 4/00* (2009.01)
*H04W 52/02* (2009.01)
(Continued)

(52) U.S. Cl.
CPC ....... *H04W 52/0229* (2013.01); *H04B 5/0037* (2013.01); *H04N 1/00315* (2013.01); *H04W 4/008* (2013.01); *H04W 36/0022* (2013.01);
(Continued)

(58) Field of Classification Search
CPC ... H04W 36/14; H04W 36/08; H04W 36/22; H04W 84/12
USPC .............. 370/331, 475, 338, 389, 252, 310; 455/556.2, 41.2; 709/220
See application file for complete search history.

(56) References Cited

U.S. PATENT DOCUMENTS

2005/0262216 A1   11/2005   Kashiwabara et al. ....... 709/208
2009/0147803 A1*   6/2009   Takayama ............ G06K 7/0008
                                                      370/475

(Continued)

FOREIGN PATENT DOCUMENTS

EP   1 633 104 A1   3/2006
EP   2 506 448 A2   10/2012
(Continued)

OTHER PUBLICATIONS

U.S. Appl. No. 14/312,168, Jun. 23, 2014.

*Primary Examiner* — Chi H Pham
*Assistant Examiner* — Alexander O Boakye
(74) *Attorney, Agent, or Firm* — Fitzpatrick, Cella, Harper & Scinto

(57) ABSTRACT

This invention suppresses power consumption of a mobile communication terminal apparatus in data exchange in wireless communications. For this purpose, when wireless communications are established between a mobile communication terminal apparatus (200) and MFP (300), the mobile terminal (200) sends a processing request to the MFP (300). Upon reception of this request, the MFP (300) re-establishes communications with the mobile terminal (200) so as to set a communication mode in a passive mode, and to share roles to have the MFP as an initiator, and the mobile terminal as a target.

20 Claims, 29 Drawing Sheets

(51) Int. Cl.
*H04B 5/00* (2006.01)
*H04W 36/00* (2009.01)
*H04N 1/00* (2006.01)
*H04W 76/02* (2009.01)

(52) U.S. Cl.
CPC ....... *H04W 36/0027* (2013.01); *H04W 76/025* (2013.01); *H04N 2201/006* (2013.01); *H04N 2201/0094* (2013.01); *H04W 52/0251* (2013.01); *H04W 76/023* (2013.01); *H04W 76/027* (2013.01); *Y02B 60/50* (2013.01)

(56) References Cited

U.S. PATENT DOCUMENTS

2010/0081376 A1   4/2010   Emura ..................... 455/41.1
2012/0258662 A1   10/2012  Takayama et al. .......... 455/41.1

FOREIGN PATENT DOCUMENTS

JP     2010-0087541      4/2010
WO     2004-109996 A1    12/2004

\* cited by examiner

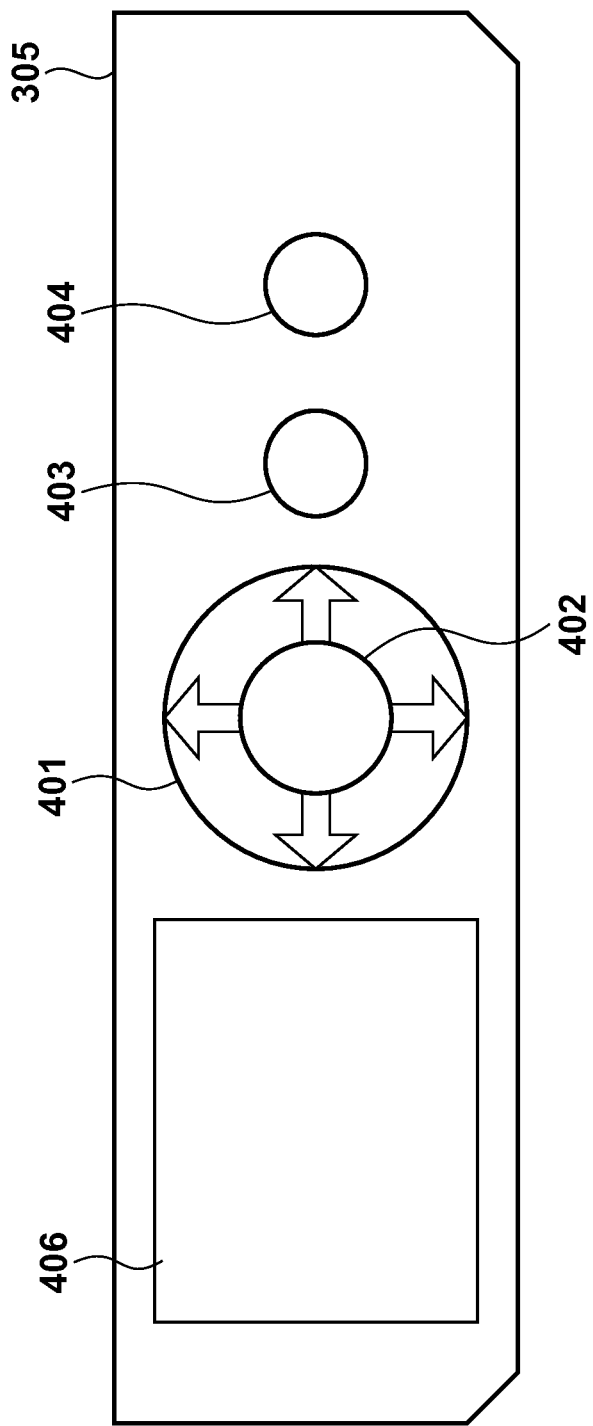

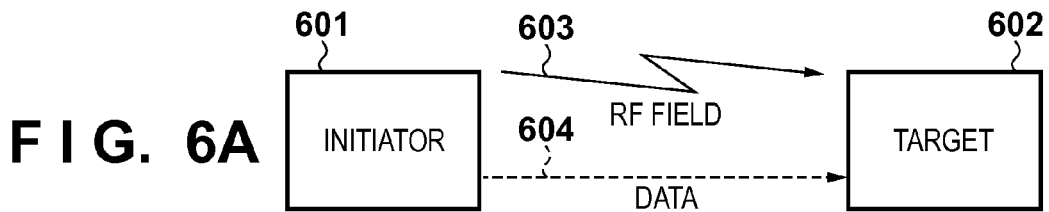
F I G. 6A
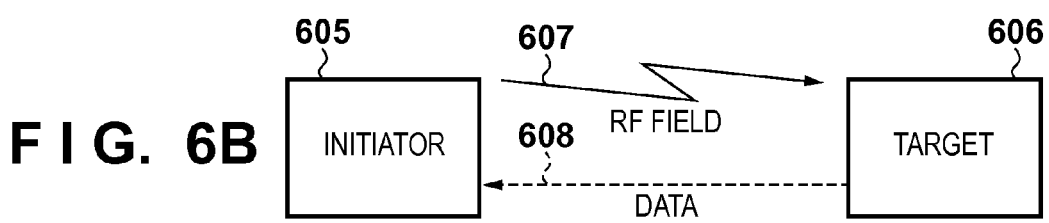
F I G. 6B
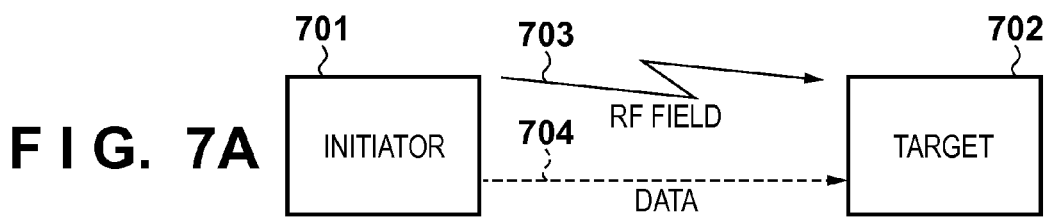
F I G. 7A
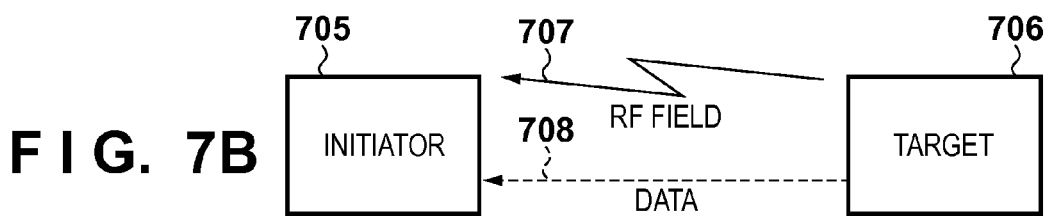
F I G. 7B F I G. 26
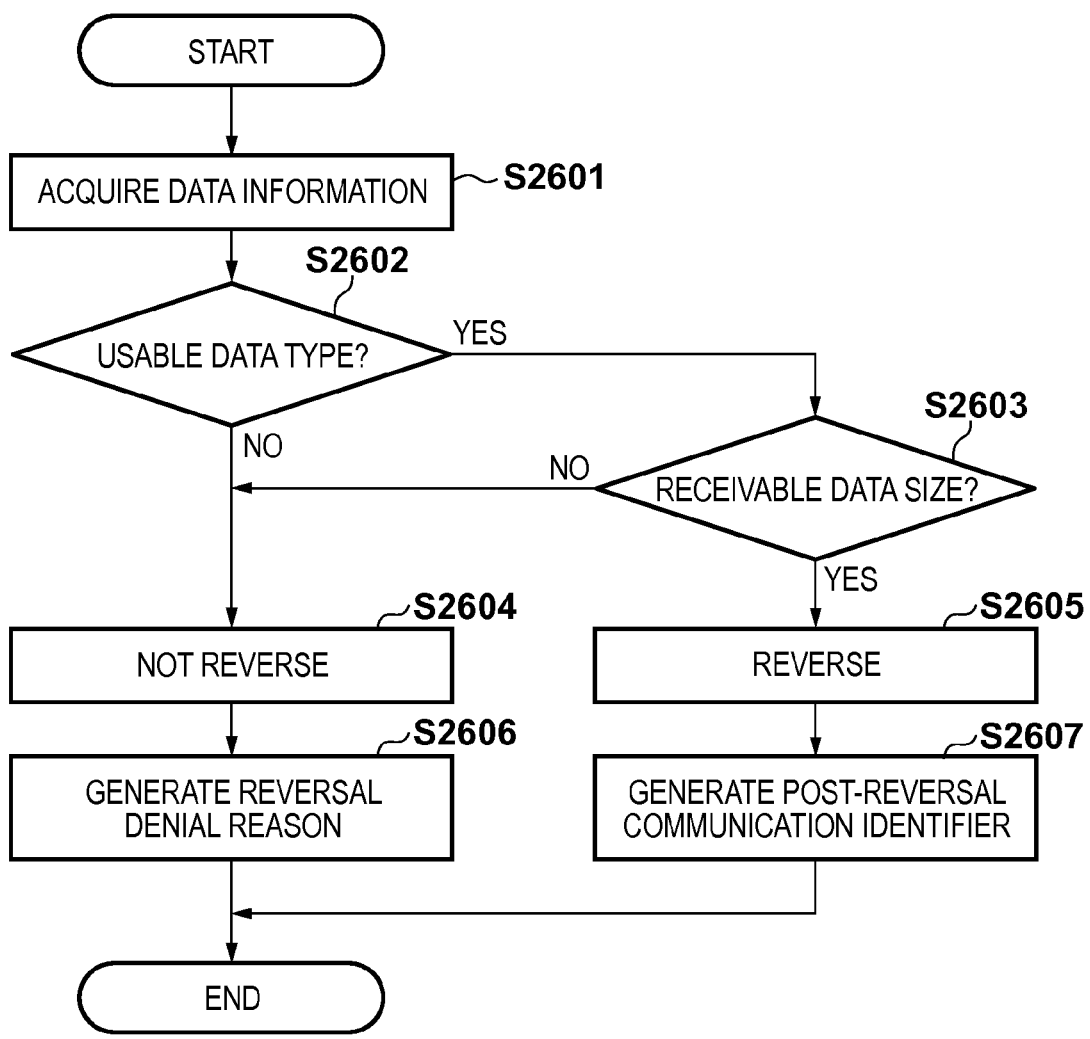

F I G. 28A
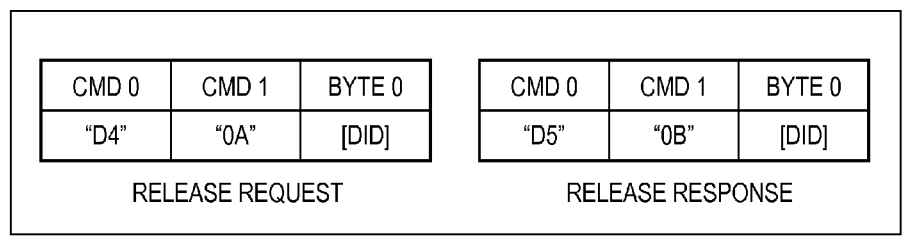
F I G. 28B
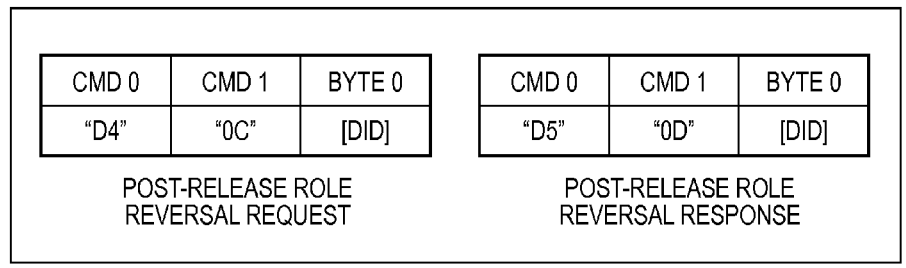

F I G. 32
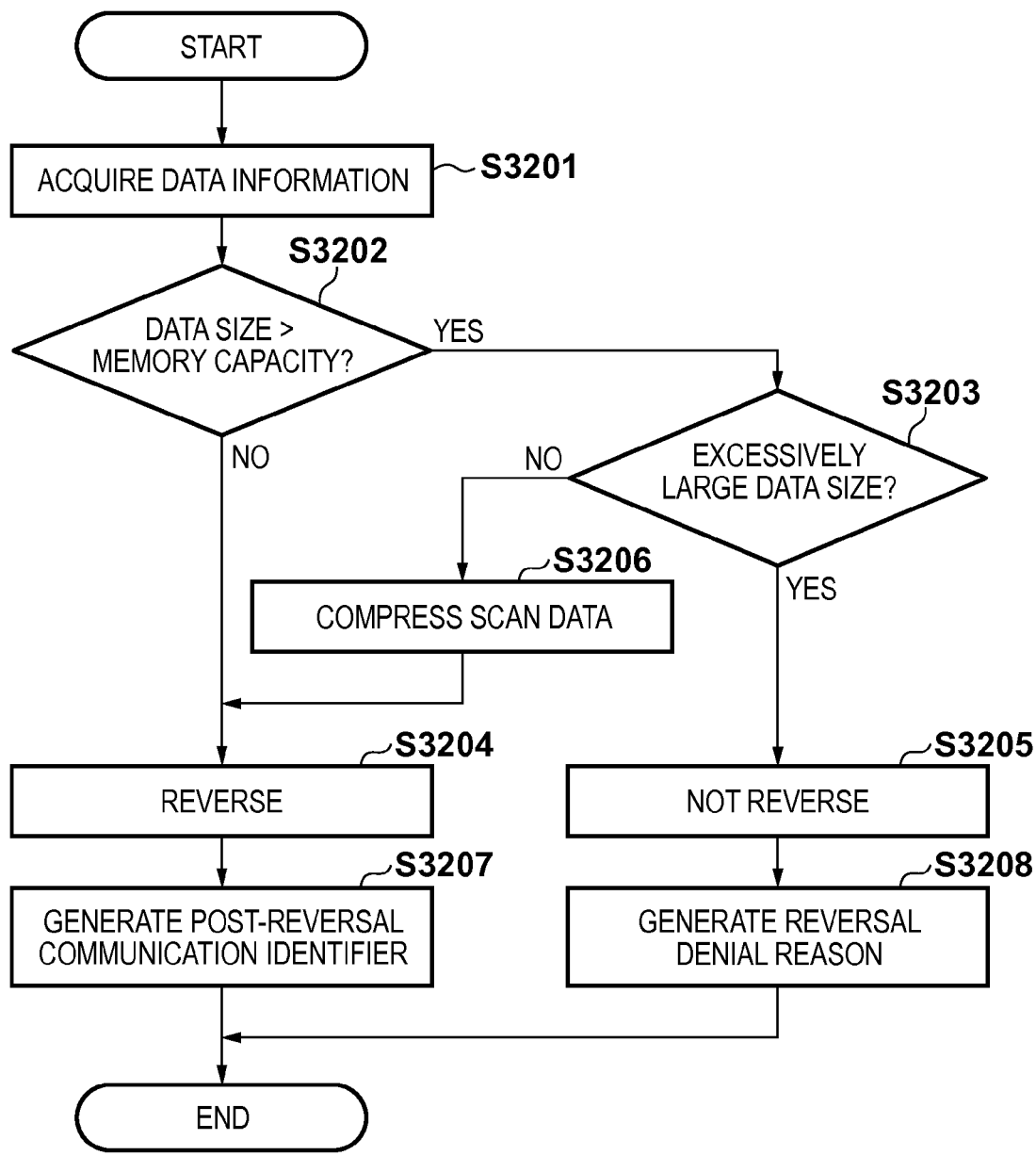

APPARATUS AND METHOD

TECHNICAL FIELD

The present invention relates to an apparatus and a method.

BACKGROUND ART

As is known, a mobile communication terminal apparatus makes short distance wireless communications in addition to communications via a communication network. Also, as is known, a partner communication apparatus of the short distance wireless communications includes, for example, a mobile communication terminal apparatus or MFP (Multi Function Printer), and these apparatuses exchange image data and the like.

In general, since a mobile communication terminal apparatus operates using electric power accumulated on a battery, there is a risk that the power supply of the mobile communication terminal apparatus may run down during communications. This tendency is conspicuous in a case in which the mobile communication terminal apparatus exchanges large-size data with, for example, an MFP.

Furthermore, as is known, in order to realize efficient communications in terms of high communication rate and low power consumption, wireless communications are made using two different communication methods. Using a first wireless communication method which requires low power consumption and a short communication distance, information required for a second wireless communication method which can assure a higher communication rate and requires a longer communication distance is exchanged. After that, respective apparatuses make high-speed communications based on the second wireless communication method using that information. This communication switching is generally called "handover". An example of the first wireless communication method is an NFC (Near Field Communication), and that of the second wireless communication method includes Bluetooth® and a wireless LAN.

"Handover" switches whether to communicate data to be exchanged via the first wireless communication, to communicate the data by the second wireless communication, or not to transfer any data, thus suppressing power consumption. As a literature which discloses such technique, for example, Japanese Patent Laid-Open No. 2010-87541 is known.

However, the method disclosed in this literature requires two different short distance wireless communication methods, and power consumption inevitably increases due to use of the second short distance wireless communication.

Even when all communications are attained by the NFC that requires low power consumption, the mobile communication terminal apparatus is expected to play a leading role of communications due to its operability and convenience (an initiator in the NFC), and inevitably consumes electric power even in the NFC.

SUMMARY OF INVENTION

The present invention has been made to solve the aforementioned problems. Then, this disclosure provides a technique for suppressing a power consumption amount of a mobile communication terminal apparatus in data exchange via wireless communications.

According to this disclosure, there is provided an apparatus comprising communication means for executing a wireless communication with a device, by establishing a first session as a target with the device for receiving electromagnetic wave generated by the device or by establishing a second session as a initiator with the device for generating electromagnetic wave; first communication control means for causing the communication means to establish the first session and acquire a request for executing a predetermined process from the device by receiving electromagnetic wave which is generated in the established first session by the device; and second communication control means for, in a case where the communication means acquires the request by the first communication control means, causing the communication means to establish the second session and to execute a communication, corresponding to processing information for executing the predetermined process, with the device by generating electromagnetic wave for the communication in the second session.

According to this disclosure, there is provided a method comprising the steps of: a communication unit establishes a first session as a target with a device for receiving electromagnetic wave generated by the device; the communication unit acquires a request for executing a predetermined process from the device by receiving electromagnetic wave which is generated in the established first session by the device; in a case where the communication unit acquires the request in the first session, the communication unit establishes a second session as a initiator with the device for generating electromagnetic wave; and the communication unit executes a communication, corresponding to processing information for executing the predetermined process, with the device by generating electromagnetic wave for the communication in the second session.

According to this disclosure, a power consumption amount of a mobile communication terminal apparatus can be suppressed in data exchange via wireless communications.

Further features of the present invention will become apparent from the following description of exemplary embodiments (with reference to the attached drawings).

BRIEF DESCRIPTION OF DRAWINGS

The accompanying drawings are included in the specification to constitute a part of the specification, and are used to illustrate embodiments of the present invention, and to explain the principle of the present invention together with the following description.

FIG. 4 is a plan view of an operation/display unit 305;

FIGS. 6A and 6B are conceptual views of a passive mode in NFC communications;

FIGS. 7A and 7B are conceptual views of an active mode in NFC communications;

FIG. 26 is a flowchart showing the processing in a role reversal determination unit according to the first embodiment;

FIGS. 28A and 28B are views showing the packet configuration for an NFC protocol and its extended example according to the third embodiment;

FIG. 32 is a flowchart showing processing in a role reversal determination unit according to the fifth embodiment.

DESCRIPTION OF EMBODIMENTS

Embodiments of the present invention will be described in detail hereinafter with reference to the accompanying drawings. However, relative layouts of components, display screens, and the like described in the embodiment do not limit the scope of the present invention unless otherwise specified.

This embodiment will explain an example in which print data is sent toward a printing apparatus while suppressing power consumption of a mobile communication terminal apparatus using a short distance wireless communication method. More specifically, this embodiment will explain a print method using short distance wireless communications such as NFC (Near Field Communications). Note that as can be seen from the following description, a processing request issued by a mobile terminal is not limited to a print request, but the mobile terminal may also issue a document scanning request. In the latter case, an information processing apparatus which executes that request includes at least an image scanner function.

[Basic Operation]

Figure 1:
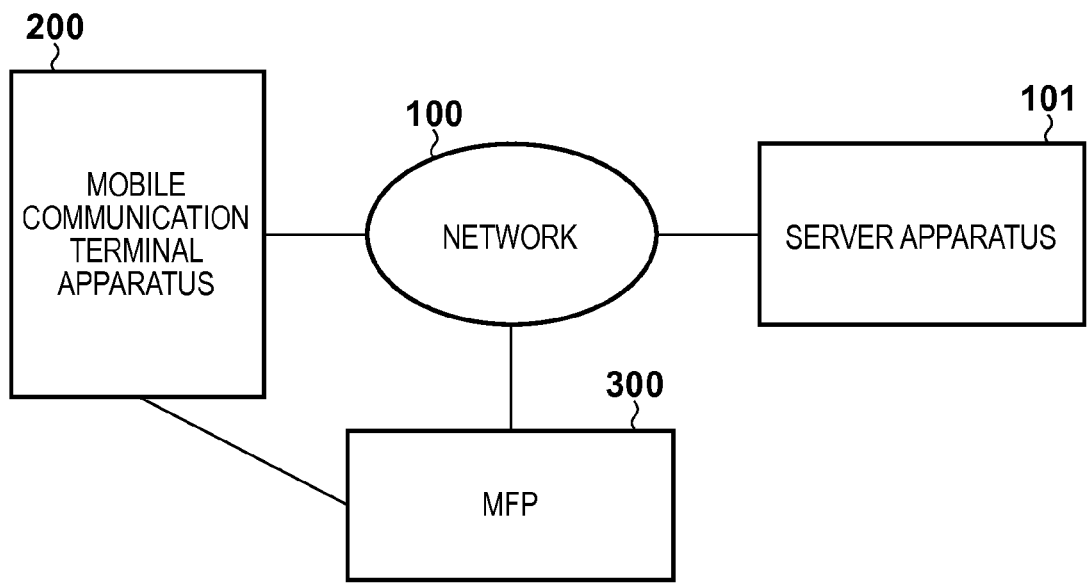
FIG. 1 is a block diagram showing the arrangement of a wireless communication system according to the present invention.

FIG. 1 shows the arrangement of an information processing system via wireless communications according to this embodiment. A server apparatus 101, mobile communication terminal apparatus 200, and MFP (Multi Function Printer) 300 are connected to a network 100 as the center. The server apparatus 101 includes a storage of image data to be printed, user ID management application, image processing application, and the like. The mobile communication terminal apparatus 200 includes at least two types of wireless communication units having different authentication methods and communication rates. The mobile communication terminal apparatus 200 is not particularly limited, and a personal information terminal such as a PDA (Personal Digital Assistant), mobile phone, digital camera, and the like may be used as long as they can handle files to be printed. The MFP 300 operates using electric power supplied from a home power supply, and has a scanning function of scanning a document placed on a platen, and a printing function of executing a print operation using a printing unit such as an inkjet printer. The MFP 300 may also have a FAX function and telephone function. The network 100 and server apparatus 101 are connected via a wired LAN. The network 100 and MFP 300 are connected via a wired LAN or wireless LAN (to be referred to as WLAN hereinafter). The network 100 and mobile communication terminal apparatus 200 are connected via a WLAN. Since both the mobile communication terminal apparatus 200 and MFP 300 have a WLAN function, they can make peer-to-peer (to be abbreviated as P2P hereinafter) communications by executing mutual authentication.

Figure 2:
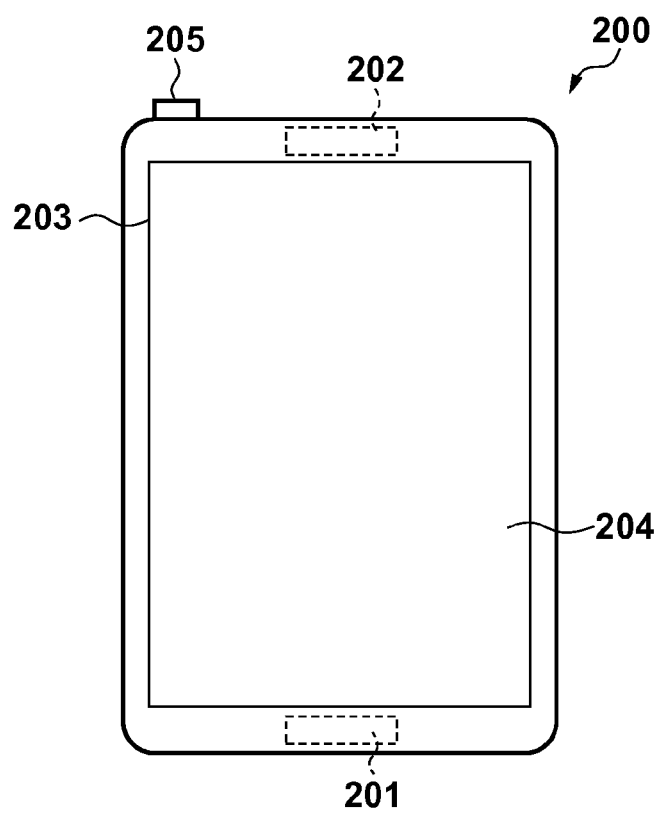
FIG. 2 is a view illustrating the outer appearance of a mobile communication terminal apparatus 200.

FIG. 2 shows the outer appearance of the mobile communication terminal apparatus 200. This embodiment will exemplify a smartphone. The "smartphone" means a multi-function mobile phone which incorporates a camera, network browser, mail function, and the like in addition to functions of a mobile phone. An NFC unit 201 is a unit required to make communications using the NFC. When the NFC unit 201 is moved closer to a partner NFC unit within a range of about 10 cm, they can communicate with each other in practice. A WLAN unit 202 is a unit required to make communications via a WLAN, and is arranged inside the mobile communication terminal apparatus 200. A display unit 203 is, for example, a display including an LCD type display mechanism. An operation unit 204 includes a touch panel type operation mechanism, and detects pressing information of the user. As a representative operation method, the display unit 203 displays software buttons, and the user presses the operation unit 204, thus issuing a button pressing event. A power key 205 is used to turn on/off a power supply.

Figure 3A:
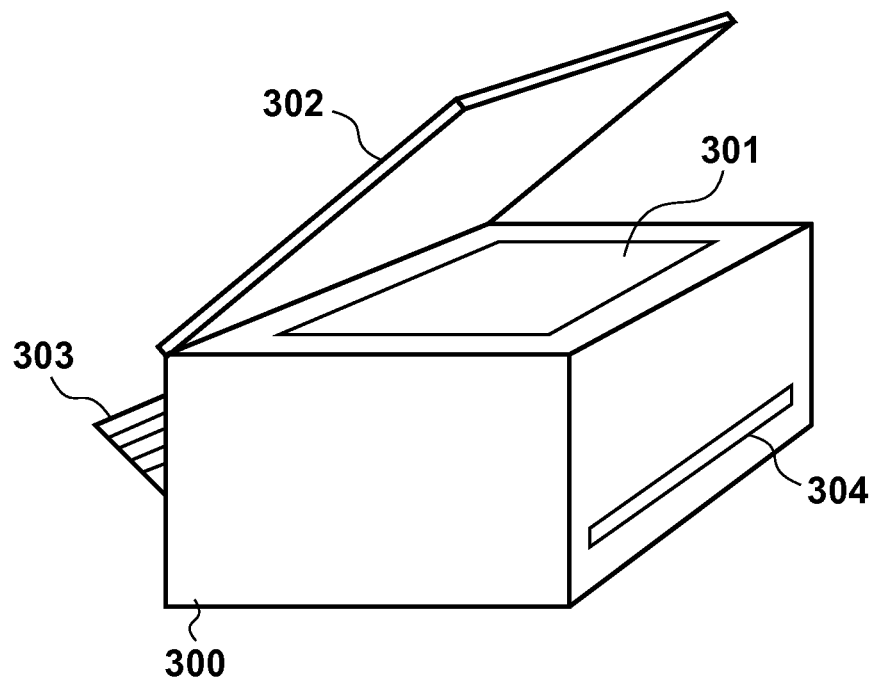
FIGS. 3A and 3B are respectively an outer appearance perspective view and top view of an MFP 300.
Figure 3B:
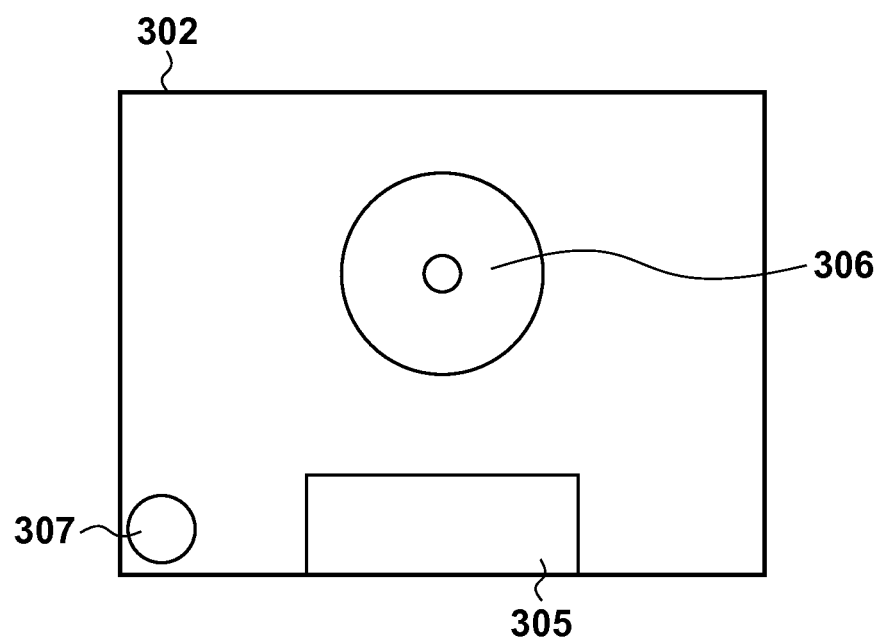

FIG. 3A is a perspective view showing the outer appearance of the MFP 300, and FIG. 3B is a top view of the MFP 300. A platen 301 is a glass-like transparent table, which is used to scan a document placed on itself using a scanner. A document cover 302 is a cover required to prevent scanning light from externally leaking at the time of scanning by the scanner. A printing sheet insertion port 303 is an insertion port on which paper sheets of various sizes are set. Paper sheets set on the printing sheet insertion port 303 are conveyed one by one to a printing unit, and are discharged from a printing sheet discharge port 304 after a desired printing operation. An operation/display unit 305 and NFC unit 306 are arranged on an upper portion of the document cover 302. The operation/display unit 305 will be described in detail later with reference to FIG. 4. The NFC unit 306 is a unit required to make short distance wireless communications, and is a place where a partner apparatus is approximated to the MFP. A distance of about 10 cm from the NFC unit 306 is an effective distance of a contact. A WLAN antenna 307 is required to make WLAN communications, and is embedded in the MFP.

FIG. 4 is a plan view of the operation/display unit 305. A display unit 406 is a display screen used to display images, an operation menu, and the like, and includes, for example, a dot matrix LCD. A 4-way selector 401 is used for operations such as cursor movements on the display unit. A set key 402 is a key used to make a setting input. A function key 403 is used to make function settings and the like. A start key 404 is used to issue a function execution instruction such as a print start instruction.

Figure 5:
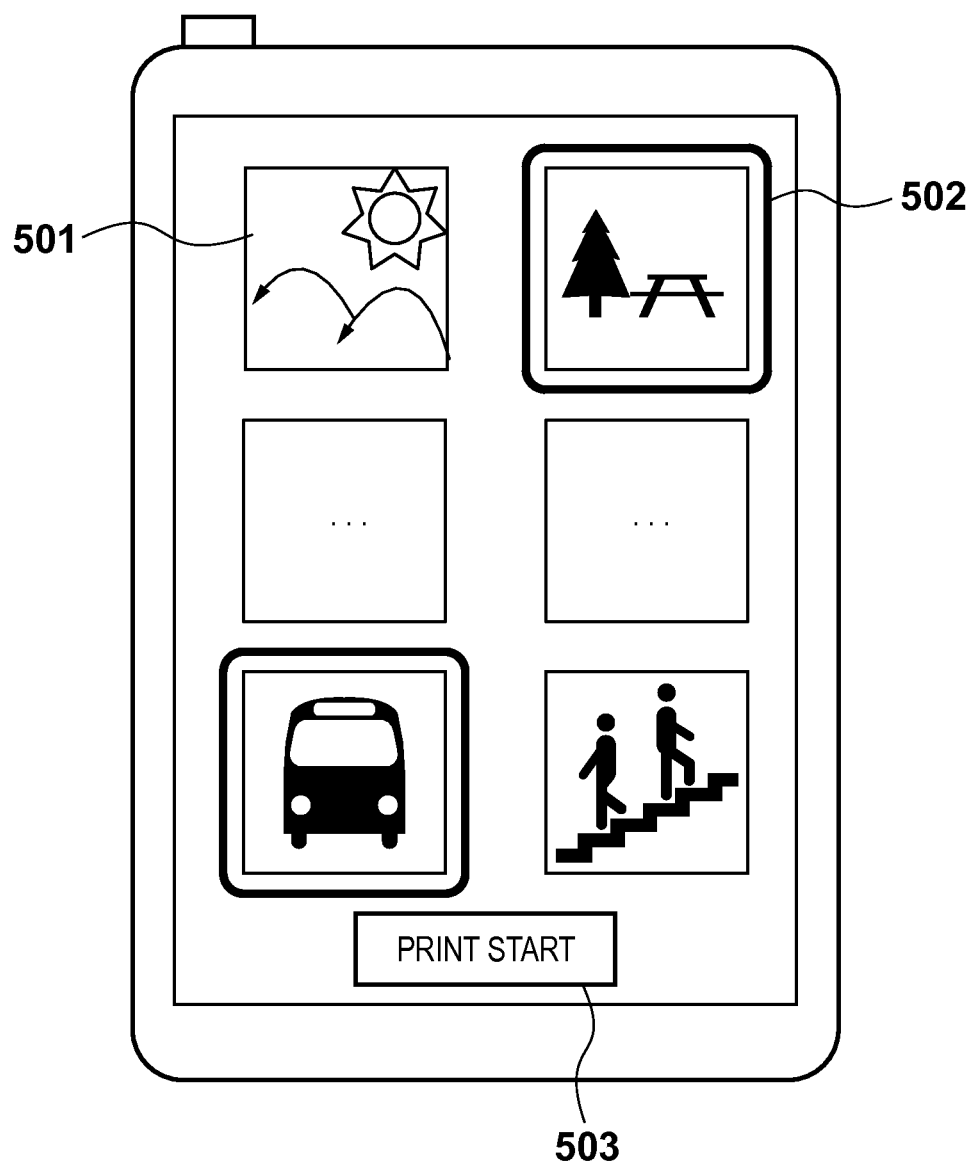
FIG. 5 is a view showing a display example of thumbnails of print candidate files on the mobile communication terminal apparatus 200.

FIG. 5 shows a display example of thumbnails of print candidate files on the mobile communication terminal apparatus 200. Thumbnails 501 are either those of files saved in the mobile communication terminal apparatus 200 or those of files saved in the server apparatus 101. When the user touches a thumbnail of an image to be printed, a focus 502 is displayed to indicate that the thumbnail is selected as a print target. The user can select a plurality of images to be printed, and the plurality of focuses 502 may be displayed on the display unit 203. When thumbnails cannot be displayed within one screen, they may be scrolled. When the user touches a print start key 503 after he or she has selected an image to be printed, a print job is sent.

The NFC communications will be described below. When near field communications are made using the NFC units, an apparatus which outputs an RF (Radio Frequency) field first to initiate a communication is called an initiator. Also, an apparatus which responds to a command issued by the initiator to communicate with the initiator is called a target.

A communication mode of the NFC unit includes a passive mode and active mode. In the passive mode, the target responds to a command of the initiator by performing load modulation of an RF field generated by the initiator. On the other hand, in the active mode, the target responds to a command of the initiator by an RF field generated by the target itself.

FIGS. 6A and 6B are conceptual views of the passive mode in the NFC communications. When data 604 is sent from an initiator 601 to a target 602 in the passive mode, as shown in FIG. 6A, the initiator 601 generates an RF field 603. The initiator 601 sends the data 604 to the target 602 by modulating the RF field 603 by itself. Also, when data 608 is transferred from a target 606 to an initiator 605 in the passive mode, as shown in FIG. 6B, the initiator 605 generates an RF field 607 in the same manner as in FIG. 6A. The target 606 performs load modulation with respect to the RF field 607, thereby sending the data 608 to the initiator 605.

FIGS. 7A and 7B are conceptual views of the active mode in the NFC communications. When data 704 is sent from an initiator 701 to a target 702 in the active mode, as shown in FIG. 7A, the initiator 701 generates an RF field 703. The initiator 701 sends the data 704 to the target 702 by modulating the RF field 703 by itself. After completion of the data sending, the initiator 701 stops outputting of the RF field 703. On the other hand, when data 708 is sent from a target 708 to an initiator 705 in the active mode, as shown in FIG. 7B, the target 706 generates an RF field 707. The target 706 sends the data 708 by the RF field 707 generated by itself, and stops outputting of the RF field 707 after completion of the sending.

Figure 8:
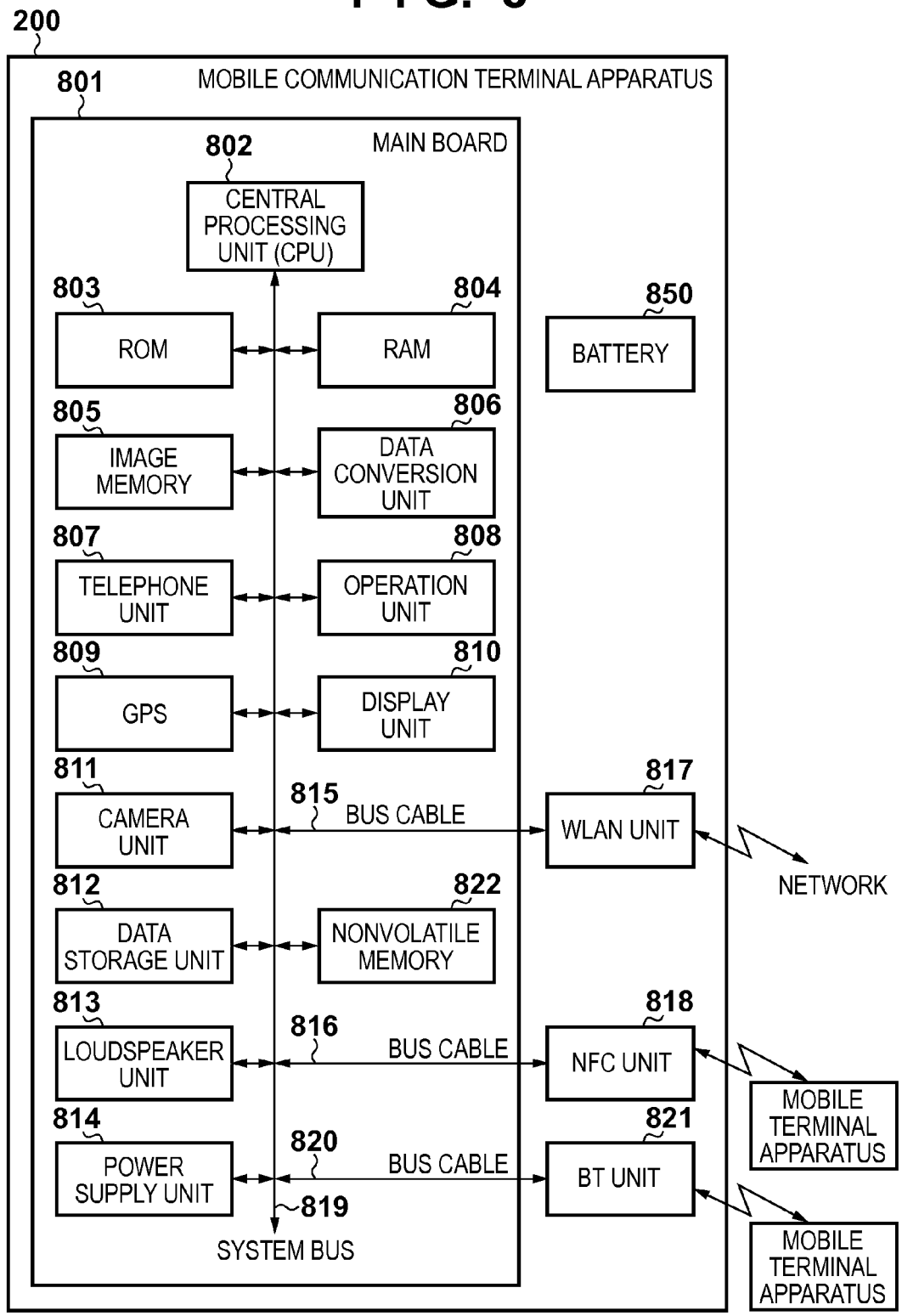
FIG. 8 is a block diagram of the mobile communication terminal apparatus.

FIG. 8 is a block diagram of the mobile communication terminal apparatus 200. The mobile communication terminal apparatus 200 includes a main board 801 which executes main control of the apparatus itself, a WLAN unit 817 which makes WLAN communications, an NFC unit 818 which makes NFC communications, a BT unit 821 which makes Bluetooth® communications, and a rechargeable battery 850.

In the main board 801, a CPU 802 is a system control unit, and controls the overall mobile communication terminal apparatus 200. A ROM 803 stores control programs to be executed by the CPU 802, embedded operating system (OS) program, and the like. In this embodiment, respective control programs stored in the ROM 803 implement software control such as scheduling and task switching under the management of the embedded OS stored in the ROM 803.

A RAM 804 includes an SRAM (Static RAM) or the like, stores data such as program control variables, also stores data such as setting values registered by the user and management data of the mobile communication terminal apparatus 200, and is allocated with various work buffer areas.

An image memory 805 includes a DRAM (Dynamic RAM) or the like, and temporarily stores image data received via a communication unit and those which are read out from a data storage unit 812 so as to be processed by the CPU 802. A nonvolatile memory 822 includes a flash memory or the like, and stores data to be saved even after power-OFF. Such data include, for example, address book data, previously connected device information, and the like. Note that such memory configuration is not limited to this. For example, the image memory 805 and RAM 804 may be shared, or data may be backed up in the data storage unit 812. In this embodiment, the DRAM is used as the image memory 805. However, the present invention is not limited to this since other storage media such as a hard disk and nonvolatile memory may be used.

A data conversion unit 806 executes analysis of a page description language (PDL) and the like, and data conversion such as color conversion and image conversion. A telephone unit 807 controls a telephone line, and realizes telephone communications by processing audio data input/output via a loudspeaker unit 813. An operation unit 808 controls signals of the operation unit 204 described using FIG. 2. A GPS (Global Positioning System) 809 acquires, for example, the current latitude and longitude, and the like. A display unit 810 electronically controls the display contents of the display unit 203 described using FIG. 2, allows various input operations, and can display operation states, status conditions, and the like of the MFP 300.

A camera unit 811 has a function of digitally recording and encoding an image input via a lens. An image captured by the camera unit 811 is saved in the data storage unit 812. The loudspeaker unit 813 realizes a function of inputting or outputting a speech for a telephone function, and also an alarm notification function and the like. A power supply unit 814 includes a portable battery, and controls that battery. A power supply state includes a battery dead state in which the battery has no remaining amount, a power-OFF state in which the power key 205 is not pressed, an active state in which the apparatus is normally active, and a power saving state in which the apparatus is active but is set in a power saving mode.

The mobile communication terminal apparatus 200 incorporates three communication units required to make wireless communications, and can make WLAN, NFC, and Bluetooth® wireless communications. Thus, the mobile communication terminal apparatus 200 serves as a communication unit which makes data communications with another device such as an MFP. The mobile communication terminal apparatus 200 converts data into packets, and makes packet transmission to the other device. Conversely, the mobile communication terminal apparatus 200 converts packets coming from another external device into data, and sends the data to the CPU 802. The WLAN unit 817, NFC unit 818, and BT unit 821 are connected respectively via bus cables and the like. The WLAN unit 817, NFC unit 818, and BT unit 821 are units required to attain communications compliant with the standards. Details of the NFC unit will be described later with reference to FIG. 10.

The respective components 803 to 814, 817, 818, 821, and 822 in the main board 801 are connected to each other via a system bus 819 managed by the CPU 802.

Figure 9:
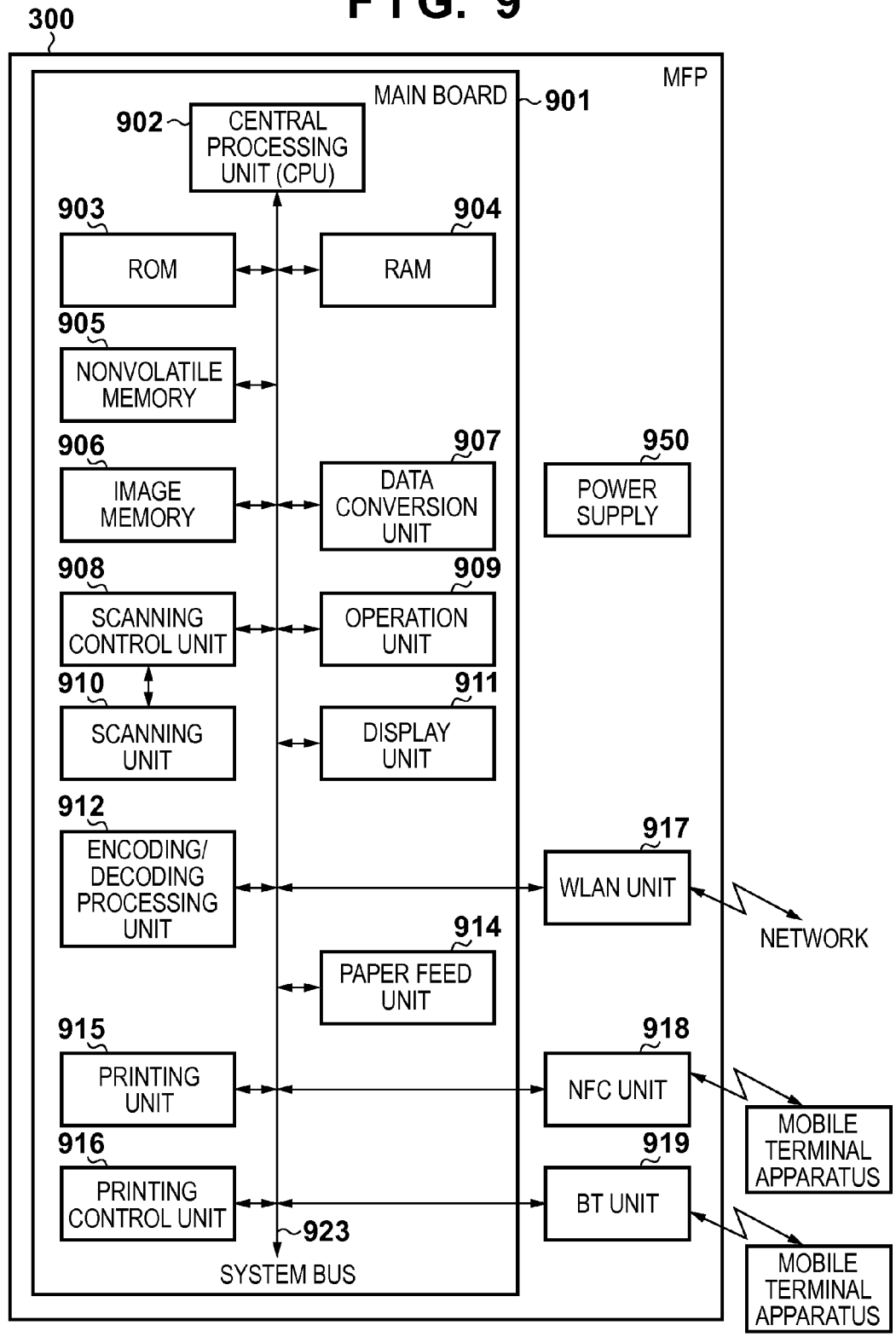
FIG. 9 is a schematic block diagram showing the arrangement of the MFP.

FIG. 9 is a schematic block diagram showing the arrangement of the MFP 300. The MFP 300 includes a main board 901 which executes main control of the apparatus itself, a WLAN unit 917 which makes WLAN communications, an NFC unit 918 which makes NFC communications, a BT unit 919 which makes Bluetooth® communications, and an AC power supply 950.

In the main board 901, a CPU 902 is a system control unit, and controls the overall MFP 300. A ROM 903 stores control programs to be executed by the CPU 902, an embedded operating system (OS) program, and the like. In this embodiment, respective control programs stored in the ROM 903 implement software control such as scheduling and task switching under the management of the embedded OS stored in the ROM 903.

A RAM 904 includes an SRAM (Static RAM), stores program control variables and the like, also stores data such as setting values registered by the user and management data of the MFP 300, and is allocated with various work buffer areas. A nonvolatile memory 905 includes a flash memory or the like, and stores data to be held even after power-OFF. More specifically, such data include network connection information, user data, and the like. An image memory 906 includes a DRAM (Dynamic RAM) or the like, and stores image data received via respective communication units, those processed by an encoding/decoding processing unit 912, and those acquired via a memory card controller 516. Also, as in the memory configuration of the mobile communication terminal apparatus 200, the present invention is not limited to such specific memory configuration. A data conversion unit 907 executes analysis of a page description language (PDL) and the like, conversion from image data into print data, and the like.

A scanning control unit 908 will be described below. A scanning unit 910 optically scans a document by, for example, a CIS sensor (contact image sensor). Next, the scanning control unit 908 applies various kinds of image processing such as binarization processing and halftone processing to an image signal converted into electrical image data via an image processing control unit (not shown), thereby outputting high-resolution image data.

An operation unit 909 and display unit 911 correspond to the operation/display unit 305 described using FIG. 4. The encoding/decoding processing unit 912 executes encoding/decoding processing and enlargement/reduction processing of image data (JPEG, PNG, etc.) handled by the MFP 300. A paper feed unit 914 can hold paper sheets used in printing. A paper sheet can be fed from the paper feed unit 914 under the control of a printing control unit 916. Especially, as the paper feed unit 914, a plurality of paper feed units can be prepared so as to hold a plurality of types of paper sheets in one apparatus. Then, the printing control unit 916 can control to select a paper feed unit used to supply paper sheets. The printing control unit 916 applies various kinds of image processing such as smoothing processing, printing density correction processing, and color correction to image data to be printed via an image processing control unit (not shown) to convert that image data into high-definition image data, and outputs the converted data to a printing unit 915. The printing control unit 916 also assumes a role of periodically reading out information of the printing unit 915, and updating information in the RAM 904. More specifically, the printing control unit 916 updates status information such as the remaining amount of an ink tank and a printhead state.

The MFP 300 also incorporates three communication units required to make wireless communications as in the mobile communication terminal apparatus 200, and a description of these communication units will not be repeated since their functions are the same. The respective components 902 to 912 and 914 to 919 are connected to each other via a system bus 923 managed by the CPU 902.

Figure 10:
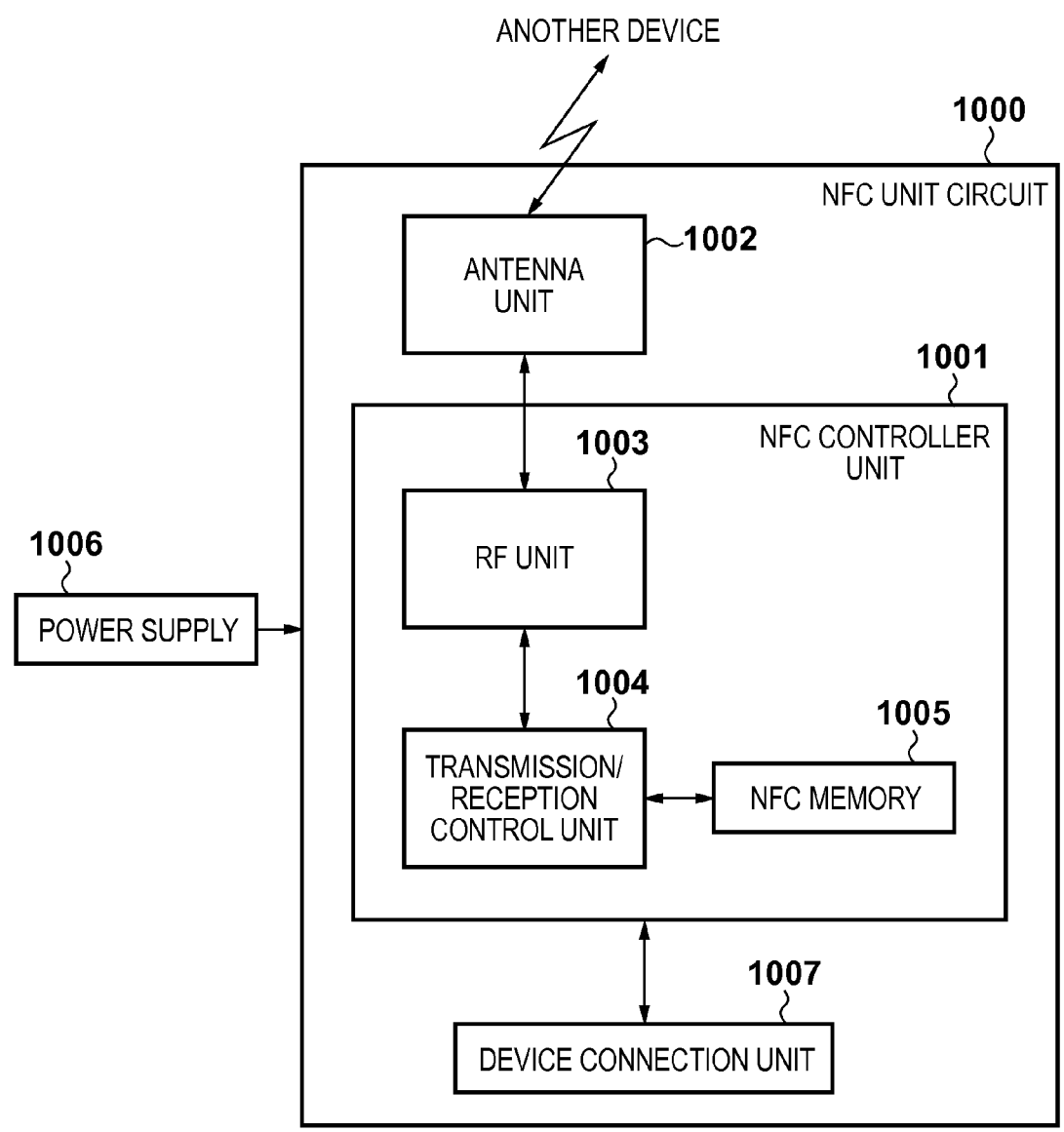
FIG. 10 is a block diagram showing details of an NFC unit.

FIG. 10 is a block diagram showing details of an NFC unit used in the NFC unit 818 or 918. The arrangement of an NFC unit 1000 will be described below with reference to FIG. 10. The NFC unit 1000 includes an NFC controller unit 1001, antenna unit 1002, RF unit 1003, sending/reception control unit 1004, NFC memory 1005, power supply 1006, and device connection unit 1007. The antenna unit 1002 receives electromagnetic waves and carriers from another NFC device, and sends electromagnetic waves and carriers to another NFC device. The RF unit 1003 has a function of modulating/demodulating an analog signal to a digital signal. The RF unit 1003 includes a synthesizer, and controls bands and channels based on frequency assigned data by identifying frequencies of bands and channels. The sending/reception control unit 1004 executes control associated with sending/reception such as assembling/disassembling of sending/reception frames, appending and detection of a preamble, and frame identification. Also, the sending/reception control unit 1004 controls the NFC memory 1005 to read/write various data and programs. When the NFC unit operates in the active mode, it receives electric power via the power supply 1006 to communicate with a device via the device connection unit 1007 and to communicate with another NFC device located within a communication range by carriers sent/received via the antenna unit 1002. When the NFC unit operates in the passive mode, it receives carriers from another NFC device via the antenna unit to receive electric power from that NFC device by electromagnetic induction, and exchanges data via communications with that NFC device by modulating carriers. That is, when the NFC device is in the passive mode, even when that NFC device itself does not supply any electric power, it can communicate with another NFC device. Hence, when the NFC device makes communications as a target in the passive mode, it can make NFC communications with an initiator device without any electric power supplied from, for example, an AC power supply connected to the NFC device or a battery included in the NFC device.

Figures 11A, 11B:
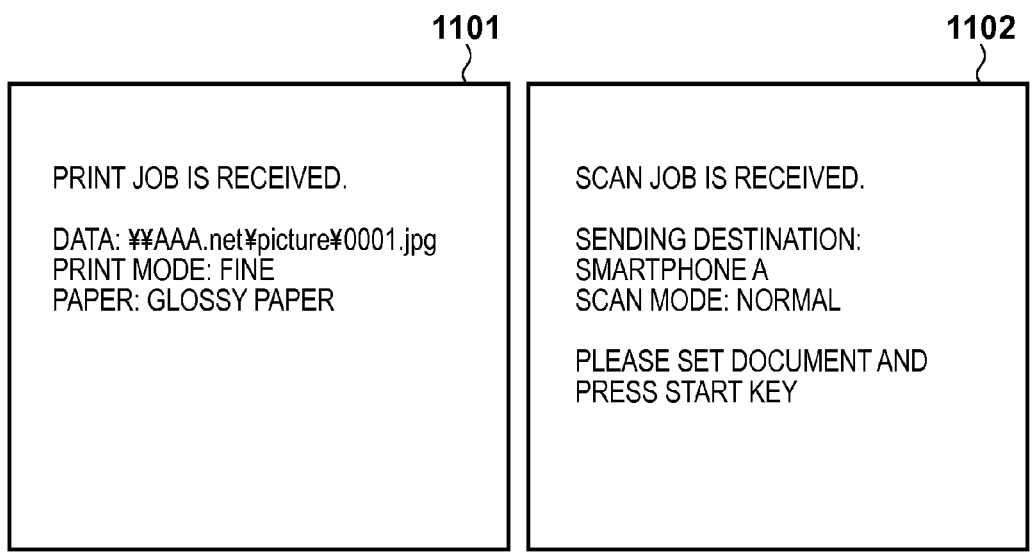
FIGS. 11A and 11B are views showing display examples on a display unit of the MFP.

FIGS. 11A and 11B show display examples on the display unit 406 of the MFP 300. When the MFP 300 receives a print job from the mobile communication terminal apparatus 200, a print job confirmation screen 1101 is displayed on the display unit 406 (FIG. 11A). When a scan job is received, a scan job confirmation screen 1102 is displayed (FIG. 11B).

Figure 12A:
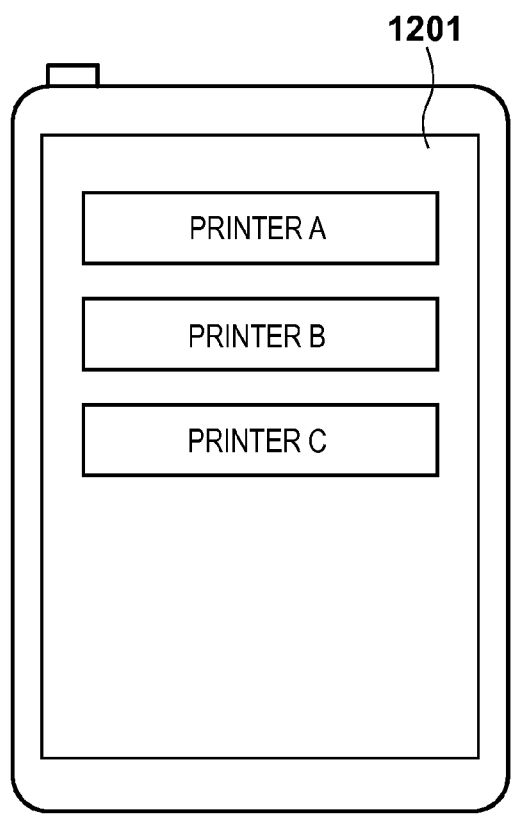
FIGS. 12A and 12B are views showing display examples on a display unit of the mobile communication terminal apparatus.
Figure 12B:
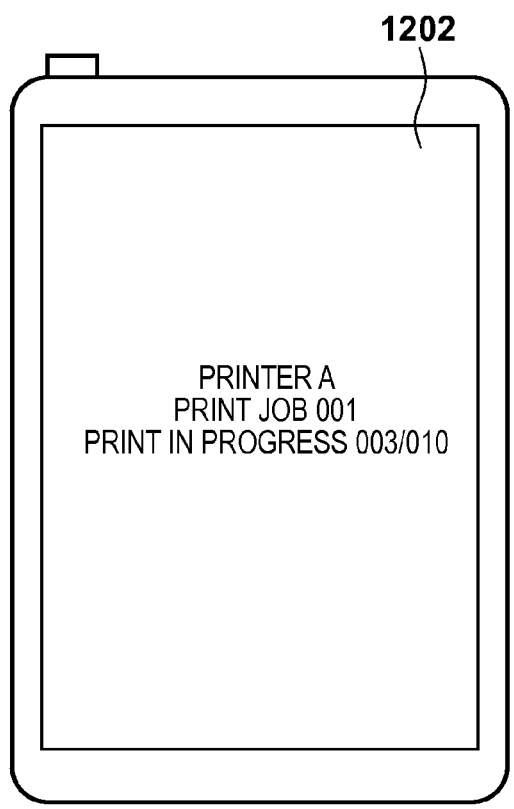

FIGS. 12A and 12B show display examples on the display unit 203 of the mobile communication terminal apparatus 200. A printer selection screen 1201 in FIG. 12A is an example of a screen which allows the user to select a printer used in a print operation. A print state display screen 1202 in FIG. 12B is an example in which the current state of a printing apparatus to which a print job is input is displayed in realtime.

Figure 13:
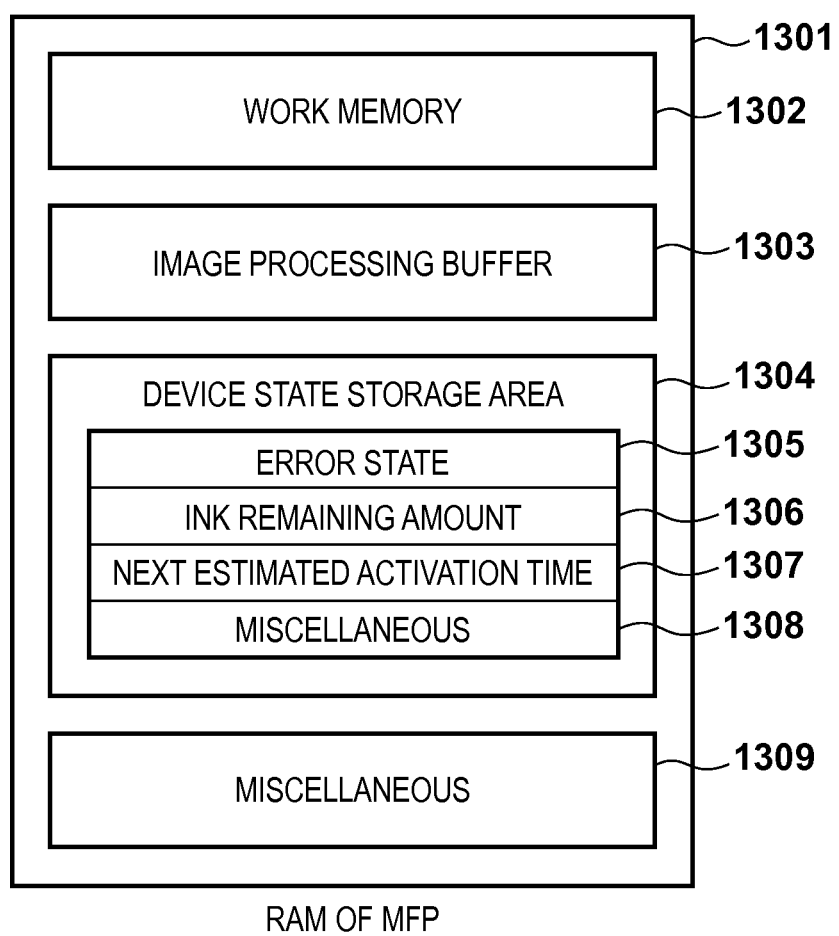
FIG. 13 is a view showing the configuration of a RAM of the mobile communication terminal apparatus.

FIG. 13 shows the configuration of the RAM 804 of the MFP 300. Reference numeral 1301 denote an entire RAM area. A work memory 1302 is a memory area allocated to execute programs. An image processing buffer 1303 is an area used as a temporary buffer for image processing. A device state storage area 1304 stores various kinds of information associated with the current state of the MFP 300. An error state 1305 stores states associated with errors of the MFP 300. Such errors include a low-ink alert, out-of-ink error, paper jam error, out-of-paper alert, printed image defect alert, scanned image defect error, network disconnection alert, and the like. These alerts and errors are associated with degrees of influence on a printing function, degrees of influence on a scanning function, and the like. For example, in case of an out-of-ink error, the printing function is not available, but the scanning function is available. In case of a network disconnection alert, functions using a network are not available, but setting changes and the scanning function, which are to be performed by the apparatus alone are available. An ink remaining amount 1306 stores a model number and ink remaining amount of a currently attached ink tank. The model number of the ink tank is updated at an attachment timing of that ink tank. The ink remaining amount is updated every time ink is used. A next estimated activation time 1307 stores an estimated activation time of the next activation timing when the power supply is turned off. The activation time of the MFP 300 largely varies depending on states. For example, a power supply state of the MFP includes a hard OFF state, soft OFF state, normal activation state, sleep state, and the like. In the hard OFF state, no electric power is supplied, and when the power supply is turned on to change the hard OFF state to the normal activation state, a long time is required. In the soft OFF state, electric power is supplied to some units, but a main program is not running. In this state, the apparatus can be activated to require a shorter time than the hard OFF state. In the sleep state, since no electric power is supplied to units which require large power consumption, but other programs and mechanisms are active, the normal activation state can be restored quickly. Another variation factor of the activation time includes error states of the apparatus. For example, when many clogged nozzles of an inkjet printhead are detected, the apparatus is activated for the next time after recovery processing for a long time. When the light amount of the scanner is reduced, the apparatus is activated after an adjustment operation. In this manner, the estimated activation time at the next activation timing is decided depending on the state transition of the power supply and the state of the apparatus. A miscellaneous 1308 stores other device states such as the current memory use amount, hardware temperature, and expendable information. A miscellaneous 1309 stores other RAM data.

Figure 14:
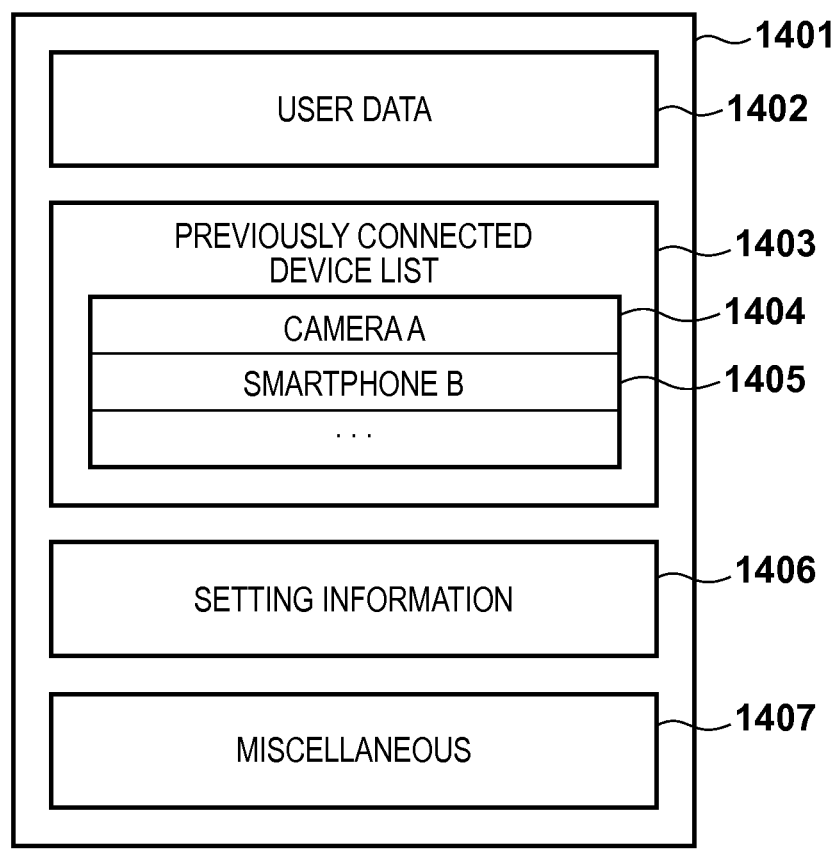
FIG. 14 is a view showing the configuration of a RAM of the MFP.

FIG. 14 shows the configuration of the nonvolatile memory 905 of the MFP 300. Reference numeral 1401 denotes an entire nonvolatile memory area. User data 1402 stores information associated with the user, and stores, for example, a FAX telephone number, communication history, network information, and the like. A previously connected apparatus list 1403 stores a list of apparatuses to which the MFP 300 was connected so far. For example, when the MFP 300 communicated with a smartphone via the NFC, the list 1403 stores an identifier of the smartphone. When the MFP 300 was P2P (peer-to-peer)-connected to a smartphone via the WLAN, the list 1403 stores identification information required for connection via the WLAN. More specifically, when WPS (Wi-Fi Protected Setup) is used for the WLAN connection, the list 1403 stores WPS Credential authentication information. When the MFP 300 was connected to a smartphone via Bluetooth, the list 1403 stores OOB authentication information. When the MFP 300 was connected to a server apparatus via a LAN, the list 1403 stores network information of the server apparatus. In case of FIG. 14, the list 1403 stores an identifier 1404 of camera A and an identifier 1405 of smartphone B, which were previously connected. Setting information 1406 stores setting information of the MFP apparatus. The setting information includes, for example, menu items such as a print mode, correction information of the inkjet printhead, and the like. A miscellaneous 1407 stores other kinds of nonvolatile information.

Figure 15:
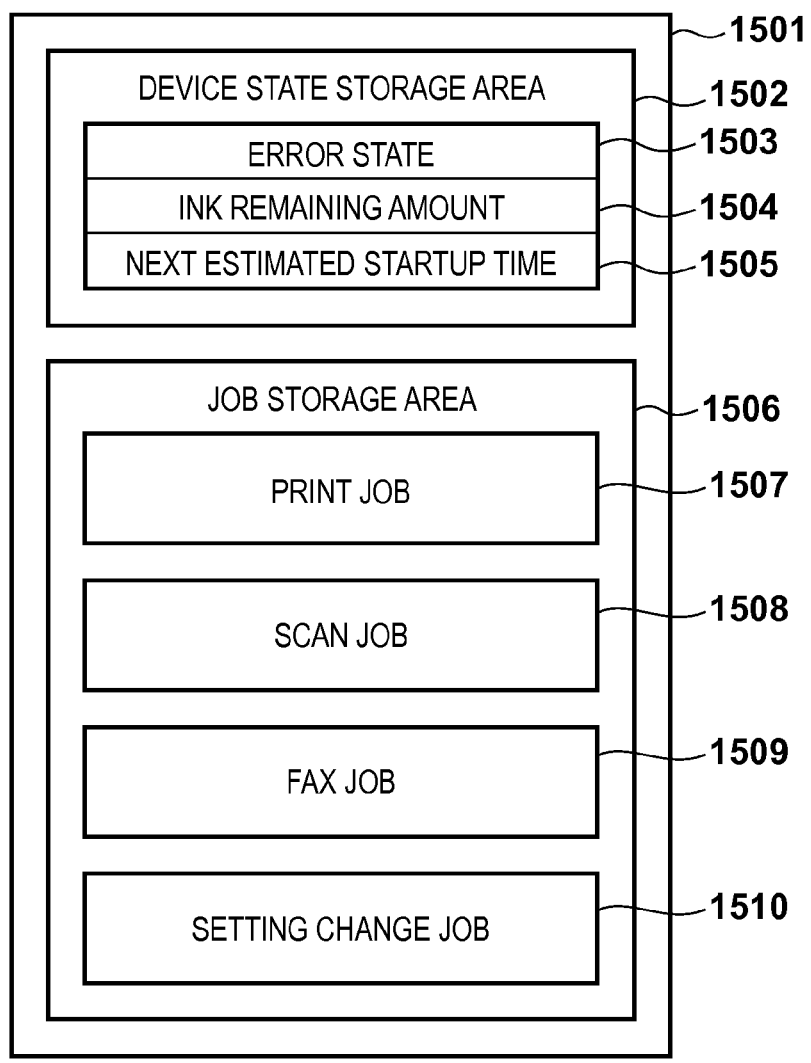
FIG. 15 is a view showing the configuration of a flash memory of the MFP.

FIG. 15 shows the configuration of the NFC memory 1005 in the NFC unit 918 of the MFP 300. Reference numeral 1501 denotes an entire NFC memory area. To a device state storage area 1502, the contents of the device state storage area 1304 are copied at a predetermined timing. Therefore, as shown in FIG. 15, areas for storing an error state 1503, ink remaining amount 1504, and next estimated activation time 1505 are allocated. A job storage area 1506 is an area used when the mobile communication terminal apparatus 200 inputs a job to the MFP 300 via NFC communications. A print job area 1507 is a queue which stores print jobs. More specifically, each print job includes information indicating print settings and a link destination to an image to be printed. A scan job area 1508 is a queue which stores scan jobs. More specifically, each scan job includes information associated with scan settings. A FAX job 1509 is a queue which stores FAX jobs. More specifically, each FAX job includes FAX setting information including a telephone number of a sending destination, communication image quality, and the like, and information indicating a link destination to an image when the image has already been scanned. A setting change job area 1510 is a queue which stores setting change jobs. More specifically, each setting change job includes information associated with changes of setting items of the main body.

Figure 16:
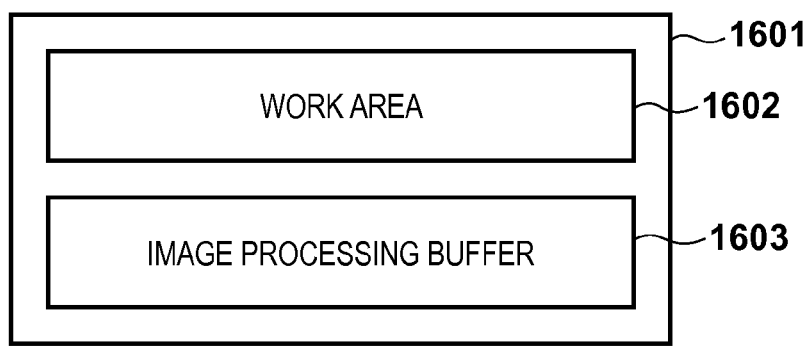
FIG. 16 is a view showing the configuration of a RAM of the mobile communication terminal apparatus.

FIG. 16 shows the configuration of the RAM 804 of the mobile communication terminal apparatus 200. Reference numeral 1601 denotes an entire RAM area. A work memory 1602 is a memory to be allocated to execute programs. An image processing buffer 1603 is a buffer used when an image is reduced to a thumbnail size or is sent to a printer by band processing.

Figure 17:
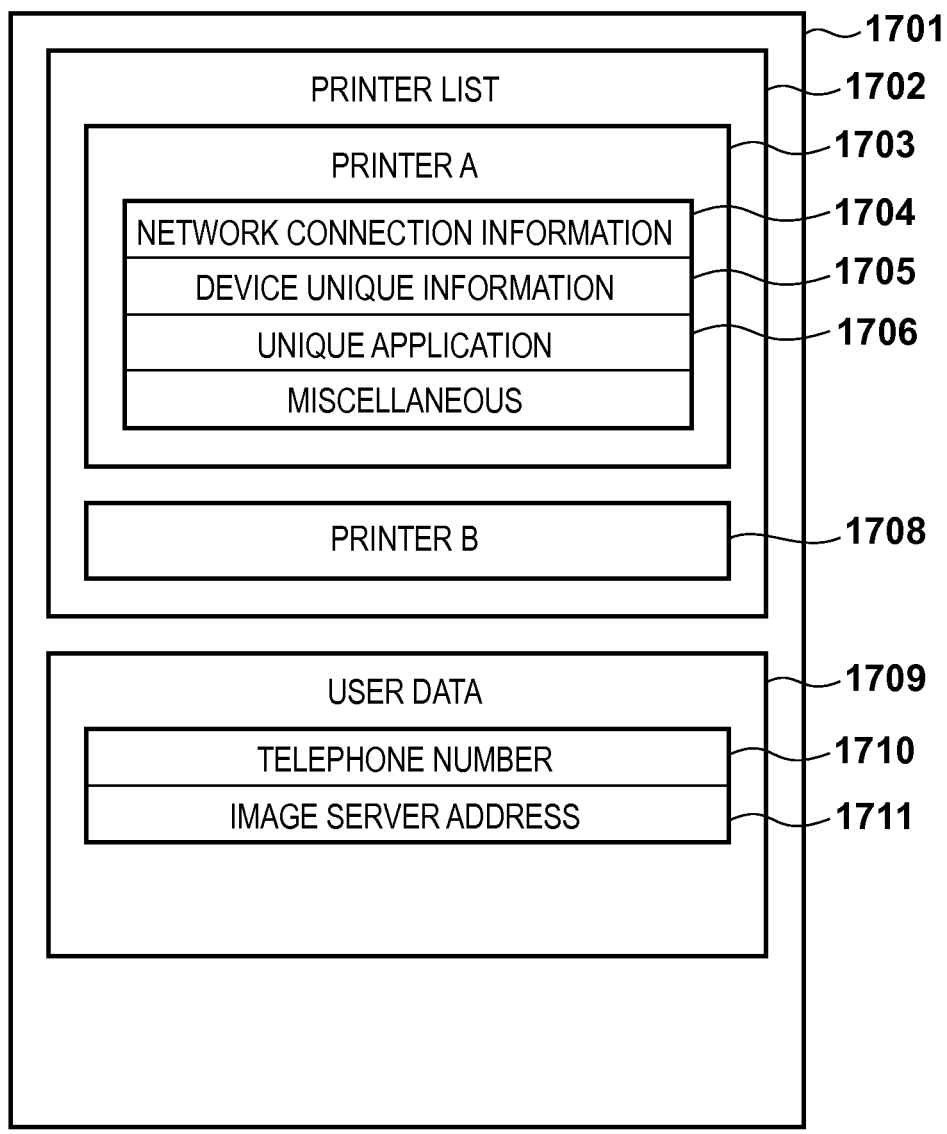
FIG. 17 is a view showing the configuration of a non-volatile memory of the mobile communication terminal apparatus.

FIG. 17 shows the configuration of the nonvolatile memory 822 of the mobile communication terminal apparatus 200. Reference numeral 1701 denotes an entire nonvolatile memory area. A printer list 1702 stores a list of printers to which the mobile communication terminal apparatus 200 was connected so far. "Printer A" 1703 represents an example of a printer. Network connection information 1704 stores network connection information when the mobile terminal was connected to printer A via a network. For example, when the mobile terminal was connected to the printer via a LAN, an address of a connection destination and authentication information are stored. Device unique information 1705 stores information associated with a printer, and stores, for example, a resolution, the number of inks, and the like of the printer. A unique application 1706 is an application required to uniquely apply processing to the printer, and is downloaded via a network or was saved in the mobile communication terminal apparatus 200 when the terminal apparatus 200 was connected to the printer for the first time. The unique application 1706 is used to convert an image into a format suited to the specification of the printer, to control band processing, and to control communications. "Printer B" 1708 is an example of another printer.

User data 1709 stores data associated with the user, that is, a telephone number 1710, image server address 1711, and the like.

Figure 18:
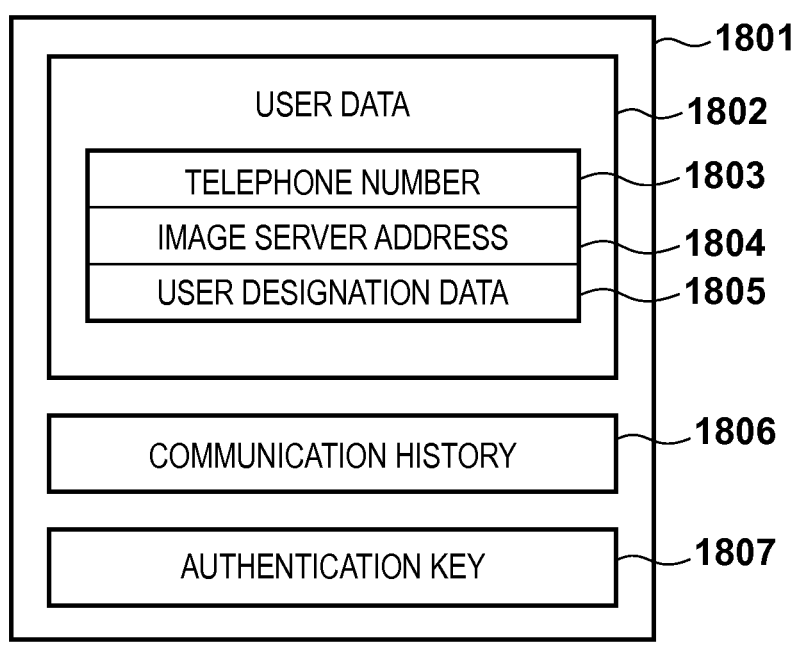
FIG. 18 is a view showing the configuration of an NFC memory of the mobile communication terminal apparatus.

FIG. 18 shows the configuration of the NFC memory 1005 in the NFC unit 818 of the mobile communication terminal apparatus 200. Data stored in this memory can undergo read/write accesses via NFC communications in the passive mode even when the battery remaining amount of the mobile communication terminal apparatus 200 has run out. Reference numeral 1801 denotes an entire NFC memory area. User data 1802 stores a telephone number 1803, image server address 1804, and the like, and user designation data 1805 and the like can be added by user designation. In addition, for example, a communication history 1806 is stored. Even when the battery remaining amount of the mobile communication terminal apparatus 200 has run out, if the terminal apparatus 200 communicates as a target in the passive mode, data in the NFC memory 1005 can undergo read/write accesses by executing authentication using an authentication key 1807 in the predetermined sequence.

Figure 19:
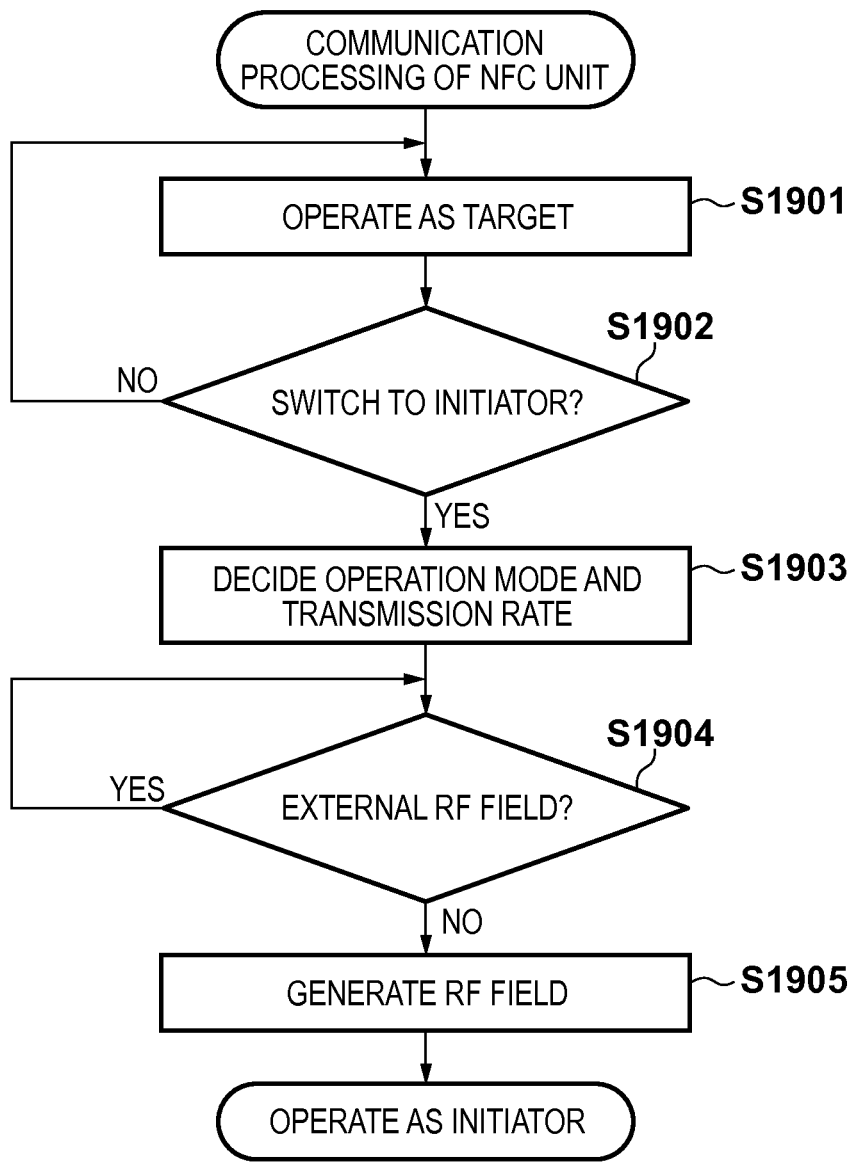
FIG. 19 is a flowchart required for the NFC unit to operate as an initiator.

FIG. 19 is a flowchart required for the NFC unit to operate as an initiator.

Initially, in step S1901, all NFC units operate as a target, and are set in a waiting state of a command from an initiator. Next, in step S1902, each NFC unit can be switched to an initiator in response to a request from an application, which controls communications based on the NFC standard. If the NFC unit is switched to an initiator in response to the request, the application has to select one of the active mode and passive mode and decide a transmission rate in step S1903. Then, in step S1904, the initiator detects an external RF field output from an apparatus other than the self apparatus. If the external RF field is detected, the initiator does not generate a self RF field. If no external RF field is detected, the process advances to step S1905, the initiator generates a self RF field. Via the aforementioned steps, the NFC unit begins to operate as the initiator.

Figure 20:
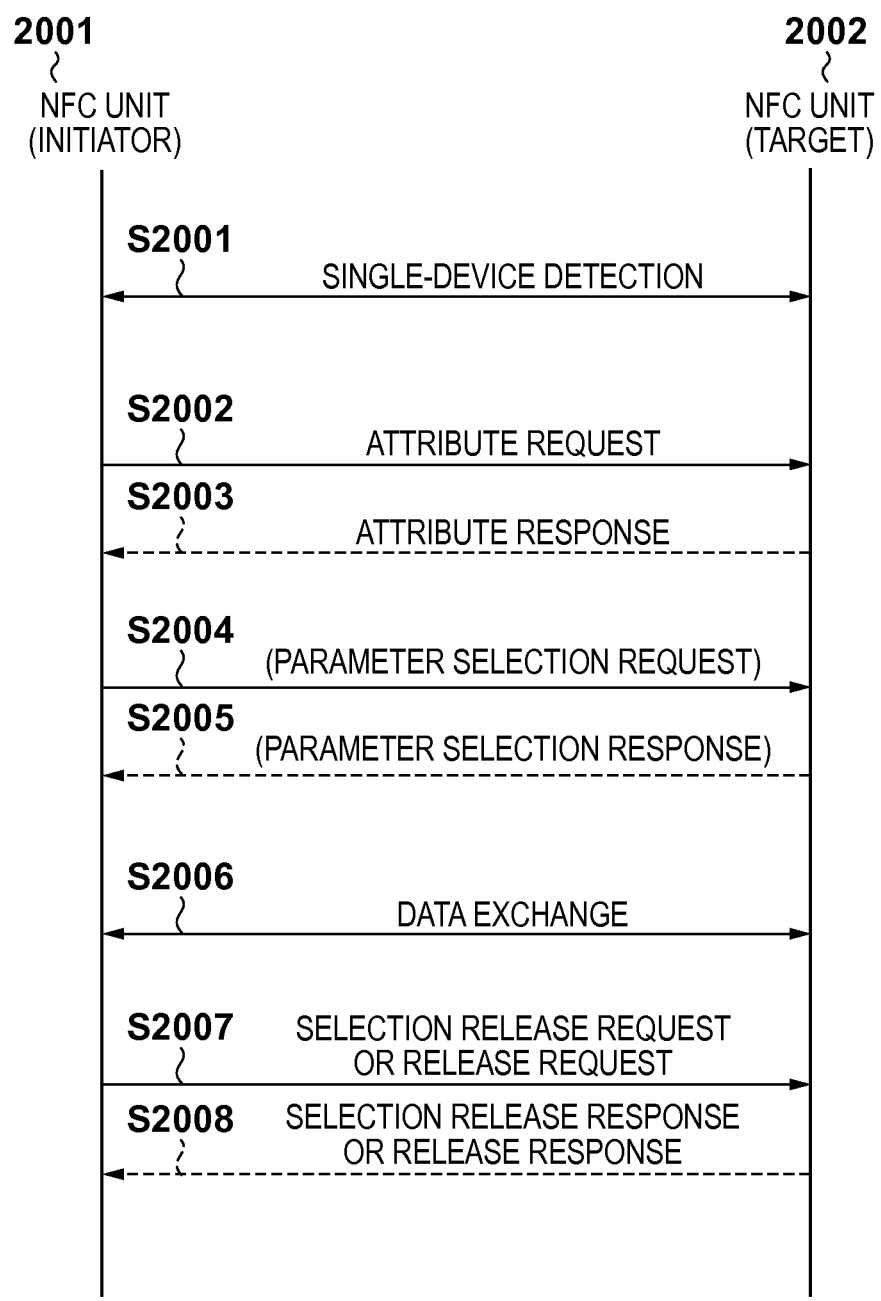
FIG. 20 is a chart showing the data exchange sequence in the passive mode.

FIG. 20 is a sequence chart of data exchange in the passive mode. A case will be described below wherein an NFC unit 2001 operates as an initiator, and an NFC unit 2002 operates as a target.

In step S2001, the NFC unit 2001 executes single-device detection to specify the NFC unit 2002. Next, in step S2002, the NFC unit 2001 sends a self identifier, a bit transmission rate of sending/reception, a valid data length, and the like as an attribute request. The attribute request has general bytes, and can be arbitrarily selected and used. When the NFC unit 2002 receives a valid attribute request, it sends an attribute response in step S2003. In this case, the response is sent from the NFC unit 2002 by load modulation, and data sending by means of load transmission is expressed by a dotted line arrow.

In step S2004, after the NFC unit 2001 confirms a valid attribute response, it sends a parameter selection request to be able to change parameters of a subsequent transmission protocol. Parameters included in the parameter selection request are a transmission rate and valid data length. When the NFC unit 2002 receives a valid parameter selection request, it sends a parameter selection response in step S2005, and changes the parameters. Note that steps S2004 and S2005 may be omitted if parameters are not changed.

In step S2006, the NFC units 2001 and 2002 exchange data by a data exchange request and data exchange response. The data exchange request and response can send information for applications included in communication partners as data, and can divisionally send information when a data size is large.

Upon completion of data exchange, the process advances to step S2007, and the NFC unit 2001 sends either a selection release request or release request. When the NFC unit 2001 transmits the selection release request, the NFC unit 2002 sends a selection release response in step S2008. Upon reception of the selection release request, the NFC unit 2001 releases the attributes indicating the NFC unit 2002, and the process returns to step S2001. When the NFC unit 2001 sends a release request, the NFC unit 2002 sends a release response and returns to an initial state in step S2008. When the NFC unit 2001 receives the release response, it may return to an initial state since the target is completely released.

Figure 21:
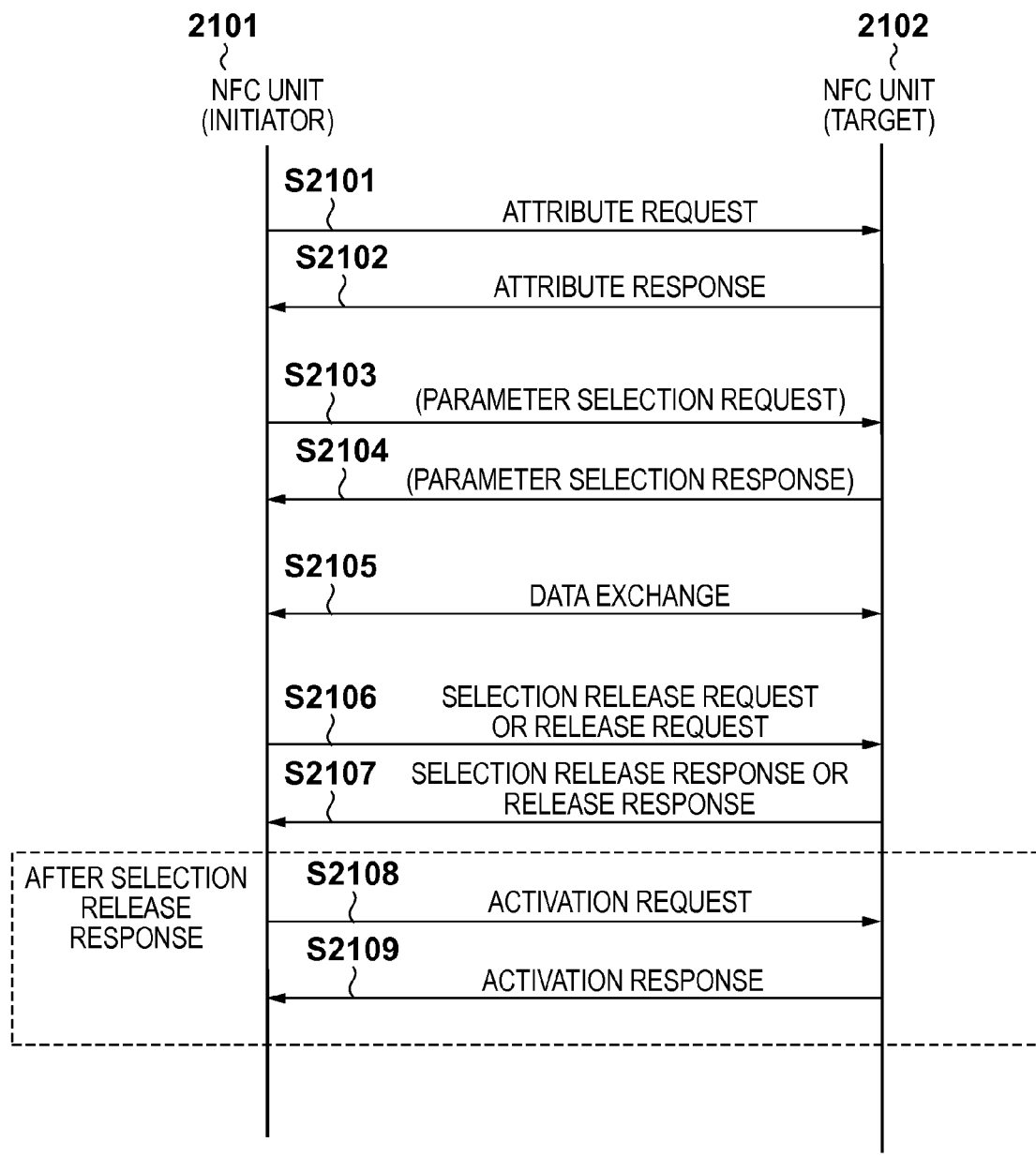
FIG. 21 is a chart showing the data exchange sequence in the active mode.

FIG. 21 is a sequence chart of data exchange in the active mode. In FIG. 21, a case will be described below wherein an NFC unit 2101 operates as an initiator, and an NFC unit 2102 operates as a target.

In step S2101, the NFC unit 2101 transmits a self identifier, a bit transmission rate of sending/reception, a valid data length, and the like as an attribute request. Upon reception of a valid attribute request, the NFC unit 2102 transmits an attribute response in step S2102. In this case, the request is sent from the NFC unit 2102 by an RF field generated by itself. For this reason, the NFC units 2101 and 2102 stop outputting of an RF field after completion of data sending.

After the NFC unit 2101 confirms a valid attribute response, it sends a parameter selection request to be able to change parameters of a transmission protocol in step S2103. Parameters included in the parameter selection request are a transmission rate and valid data length. Upon reception of a valid parameter selection request, the NFC unit 2102 sends a parameter selection response and changes the parameters in step S2104. Note that as in the passive mode, steps S2103 and S2104 may be omitted if the parameters are not changed.

In step S2105, the NFC units 2101 and 2102 exchange data by a data exchange request and data exchange response. The data exchange request and response can send information for applications included in communication partners as data, and can divisionally send information when a data size is large.

Upon completion of data exchange, the process advances to step S2106, and the NFC unit 2101 sends either a selection release request or release request. When the NFC unit 2101 sends the selection release request, the NFC unit 2102 sends a selection release response in step S2107. Upon reception of the selection release request, the NFC unit 2101 releases the attributes indicating the NFC unit 2102. After that, the NFC unit 2101 sends an activation request to another target, an identifier of which is given in step S2108. A target, which received the activation request, sends an activation response in step S2109, and the process returns to step S2101. When the NFC unit 2101 sends the release request, the NFC unit 2102 sends a release response in step S2108 and returns to the initial state. When the NFC unit 2101 receives the release response, it may return to the initial state since the target is completely released.

Figure 22:
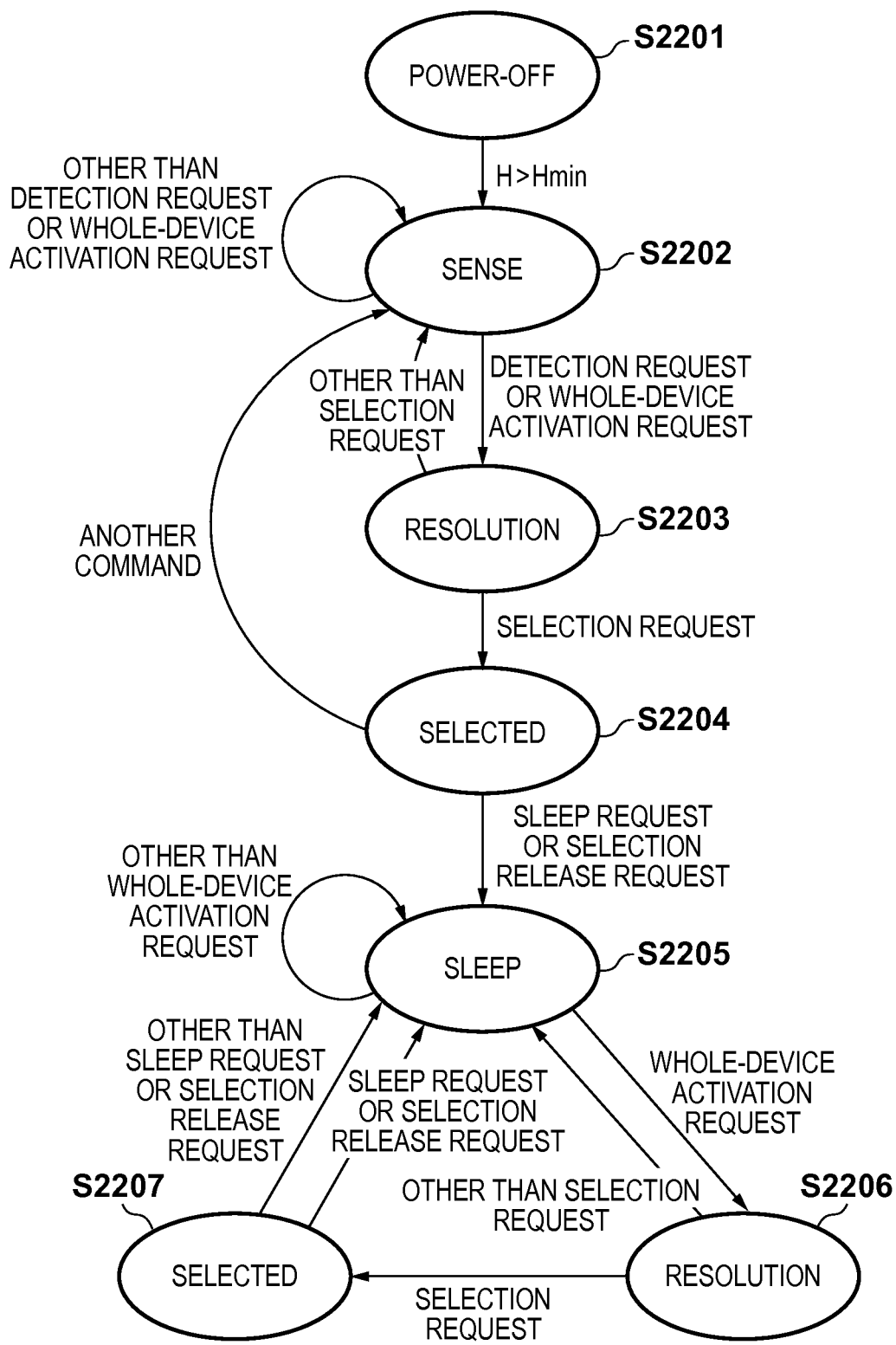
FIG. 22 is a state transition chart of a target in an NFC.

FIG. 22 shows state transitions of a target in the NFC. A POWER-OFF state S2201 represents a power-off state. In this state S2201, when the target is placed in a magnetic field H larger than a threshold Hmin, it transits to a SENSE state S2202.

In the SENSE state S2202, the target waits for a command from an initiator. Upon reception of a detection request or whole-device activation request, the target transits to a RESOLUTION state S2203, and returns a detection response. Upon reception of another command, the target stays in the SENSE state S2202.

In the RESOLUTION state S2203, single-device detection is used. When a valid selection request is received as a result of the single-device detection, the target returns a selection response to an initiator, and transits to a SELECTED state S2204. Upon reception of another command, the target returns to the SENSE state S2202.

In the SELECTED state S2204, the target recognizes an attribute request, a parameter selection request, or a command of a valid unique specification. Upon reception of a valid sleep request or selection release request, the target transits to a SLEEP state S2205. Upon reception of another command, the target returns to the SENSE state S2202.

Upon reception of a whole-device activation request, the target in the SLEEP state S2205 returns a detection response, and then transits to a RESOLUTION* state S2206. Upon reception of another command, the target stays in the SLEEP state S2205.

The RESOLUTION* state S2206 is nearly the same as the RESOLUTION state S2203, and single-device detection is used. Upon reception of a valid selection request, the target transits to a SELECTED* state S2207. Upon reception of another command, the target stays in the SLEEP state S2205.

The SELECTED* state S2207 is nearly the same as the SELECTED state S2204, and the target recognizes an attribute request, a parameter selection request, or a command of a valid unique specification. Upon reception of a valid sleep request or selection release request, the target transits to the SLEEP state. Upon reception of another command, the target falls back to the SLEEP state.

Figure 23:
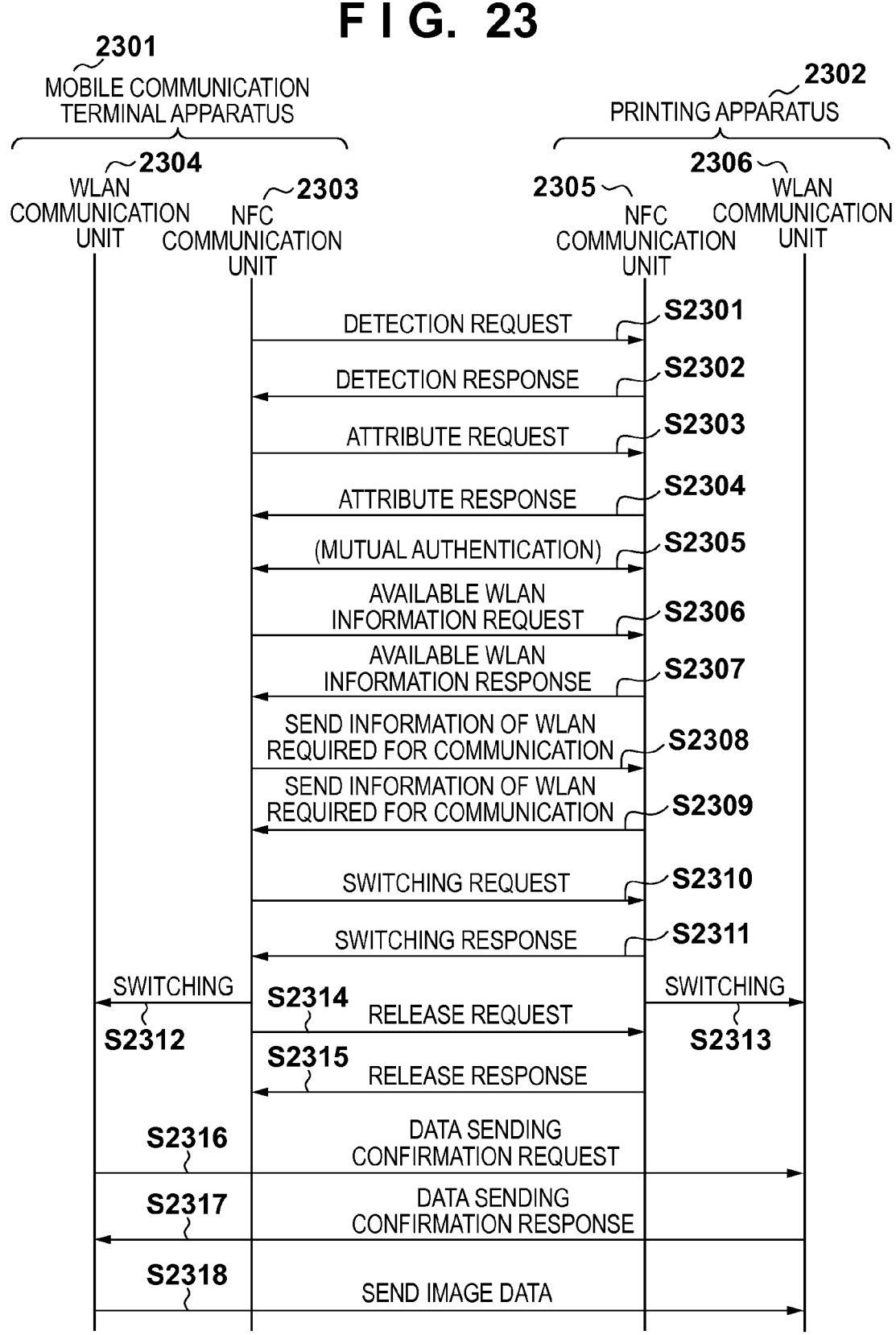
FIG. 23 is a chart showing the data transfer sequence while switching a communication method between the NFC and WLAN.

FIG. 23 shows the sequence when data transfer is performed while switching a communication method between the NFC and WLAN. Since the communication rate of the NFC is relatively as low as several hundred bps, authentication or the like is executed via the NFC, and large-size data is transferred using the faster WLAN, thus attaining efficient data transfer. FIG. 23 shows an example of so-called PUSH type communications in which in order to print image data stored in a mobile communication terminal apparatus 2301 using a printing apparatus 2302, the mobile communication terminal apparatus 2301 transfers the print data as an initiator.

In step S2301, in order to establish NFC communications, an NFC communication unit 2303 serves as an initiator, and detects an NFC communication unit 2305 of the printing apparatus 2302 as a target. When the NFC communication unit 2305 is normally detected, the NFC communication unit 2305 sends a detection response in step S2302. Note that the example shown in FIG. 23 indicates the case in which the mobile communication terminal apparatus 2301 serves as an initiator. However, in practice, the printing apparatus 2302 may serve as an initiator based on an input from the operation unit 305 or the like. When the detection response is normally received, the NFC communication unit 2303 sends an attribute request required to make NFC communications in step S2303. The NFC communication unit 2305, which received the attribute request, returns an attribute response in step S2304. Note that the attribute request and response send NFC IDs of the initiator and target, respectively, and communication partners are specified by these IDs.

In step S2305, mutual authentication is executed, and an encryption key or the like required for data encryption can be passed. Note that when an encryption key need not be passed, this mutual authentication may be skipped. After that, in step S2306, the NFC communication unit 2303 requests the NFC communication unit 2305 to send information of available communication protocols of the printing apparatus 2302. This request includes information of available communication protocols of the mobile communication terminal apparatus 2301. Hence, upon reception of this request, the NFC communication unit 2305 can recognize that WLAN communications of the mobile communication terminal apparatus 2301 are available. In step S2307, the NFC communication unit 2305 responds information of available communication protocols of itself as a response to the request received in step S2306. Thus, both the apparatuses can mutually recognize their available communication protocols.

Assume that a WLAN as a recognized protocol other than the NFC can attain faster data transfer than the NFC, and the mobile communication terminal apparatus as the initiator decides to make communications by switching the communication method to the WLAN. Note that a decision required to switch the communication method may be made by the printing apparatus. In this case, in steps S2308 and S2309, for example, information such as an address required to specify a communication partner, which is required to make communications via the WLAN, is exchanged. After that, the process advances to step S2310, and the NFC communication unit 2303 sends a switching request from the NFC communications to WLAN communications. Upon reception of the switching request, the NFC communication unit 2305 returns a response in step S2311.

After the normal switching response is obtained, the NFC communication unit 2303 is switched to a WLAN communication unit 2304 in step S2312, and the NFC communication unit 2305 is switched to a WLAN communication unit 2306 in step S2313. After the switching, the NFC communication unit 2303 sends a release request in step S2314. The NFC communication unit 2305, which received the release request, sends a release response in step S2315, and closes the NFC communications.

In step S2316 and subsequent steps, the WLAN communications are made based on the pieces of information which are exchanged in steps S2308 and S2309 and are required for the WLAN communications. In step S2316, the WLAN communication unit 2304 confirms the WLAN communication unit 2306 whether or not data transfer can be made. In this case, the contents to be confirmed include, for example, a free space required to temporarily save an image to be transferred in the printing apparatus 2302. After reception of the confirmation request, the WLAN communication unit 2306 sends a response to the confirmation request in step S2317. When the WLAN communication unit 2304 can obtain a normal response, and determines that data transfer can be made, it sends image data stored in the mobile communication terminal apparatus 2301 to the WLAN communication unit 2306 in step S2318. In this manner, large-size data can be transferred using a faster communication protocol.

Figure 24:
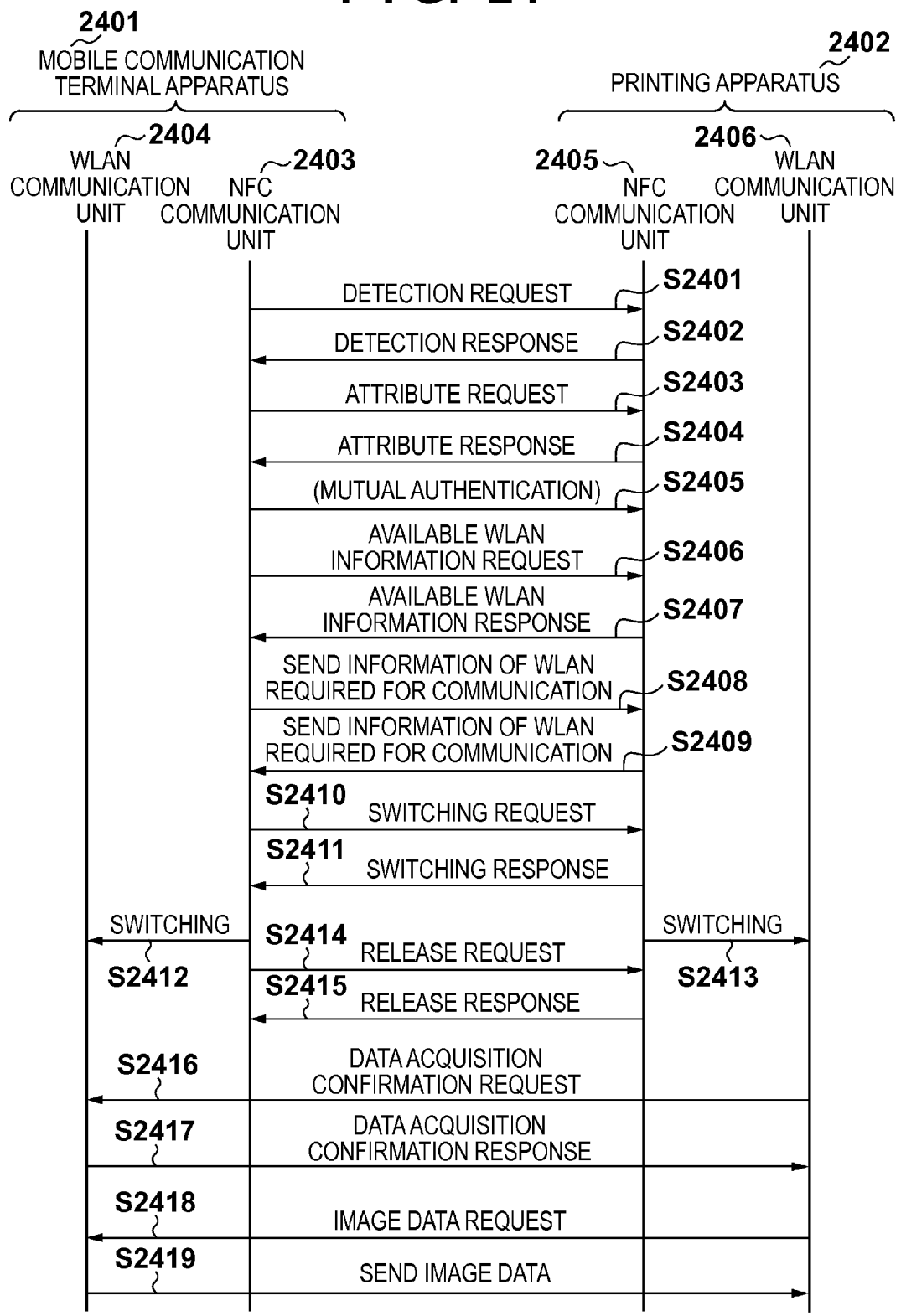
FIG. 24 is a chart showing an example of pull type communications.

FIG. 24 shows an example of so-called PULL type communications in which in order to print image data stored in a mobile communication terminal apparatus 2401 using a printing apparatus 2402, the printing apparatus 2402 transfers the image data as an initiator.

The sequence from steps S2401 to S2415 is the same as that in FIG. 23.

After the communications are switched from those based on the NFC standard to the WLAN communications, a WLAN communication unit 2406 sends a data acquisition confirmation request to a WLAN communication unit 2404 in step S2416. In this case, the contents to be confirmed include, for example, a data size to be planned to be transferred by the mobile communication terminal apparatus 2401 and the like. After the WLAN communication unit 2404 receives the confirmation request associated with transfer data, it sends a response in step S2417. When the WLAN communication unit 2406 obtains a normal response, and determines that data transfer can be made in consideration of a free space of the printing apparatus and the like, it sends an image data request in step S2418. Upon reception of a normal request, the WLAN communication unit 2404 sends the requested image data in step S2419.

First Embodiment

An example in which data of the mobile communication terminal apparatus 200 is printed using the MFP 300 while suppressing power consumption using the NFC communication method will be described below.

Figure 25:
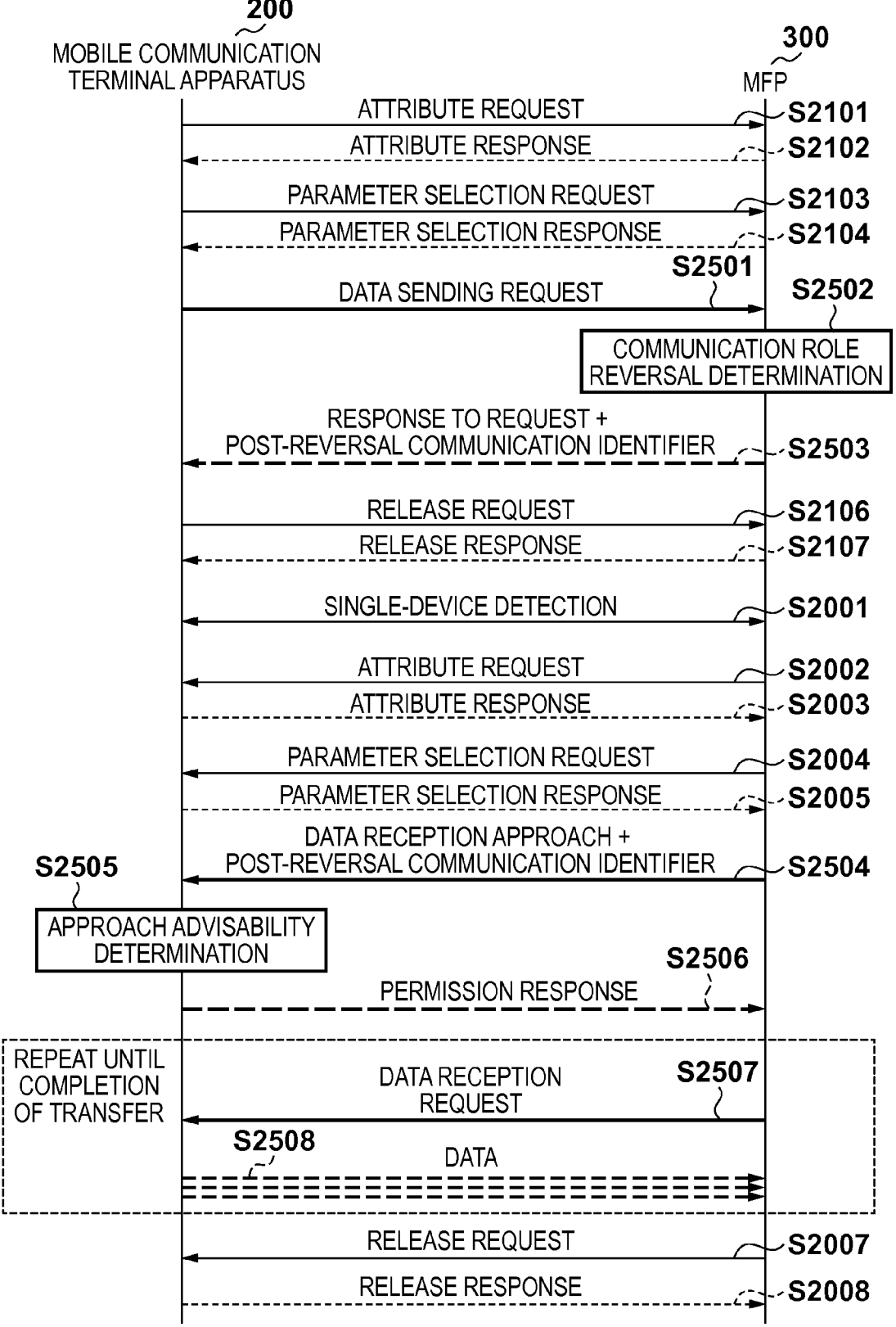
FIG. 25 is a flowchart showing exchange of commands between the MFP and mobile communication terminal apparatus mobile communication terminal apparatus according to the first embodiment.

FIG. 25 is a flowchart for explaining exchange of commands between the MFP 300 and mobile communication terminal apparatus 200 according to the first embodiment. In the following description, the same step numbers denote the same processes as in FIGS. 20 and 21. In this example, the mobile communication terminal apparatus 200 serves as an initiator, the MFP 300 serves as a target, and communications are started in the active mode. Note that the communications may be started in the passive mode.

In steps S2101 to S2104, the same processes as those in FIG. 21 are executed. With these processes, a first session in which the mobile communication terminal apparatus 200 serves as an initiator and the MFP 300 serves as a target is established, thus allowing data exchange between the mobile communication terminal apparatus 200 and MFP 300.

In step S2501, the mobile communication terminal apparatus 200 issues a data sending request to the MFP 300 in the first session. Since this embodiment explains the example in which the mobile communication terminal apparatus 200 prints image data using the MFP 300, this request can also be called a print request. This request describes information associated with data to be printed, which is held by the mobile communication terminal apparatus 200. For example, this request describes a list of a data name, data type, data storage location, and data size as a set. The data name is text information indicating a name (generally called a file name). The data type is text information indicating a type (generally called a file extension), but it may be included in the data name. The data storage location is a storage location in the user designation data 1805, and is text information indicating a file path (generally called a folder or directory). The data size is numerical value information indicating a logical size of data (generally called a file size). The aforementioned kinds of information may be a uniquely defined character string. Also, the request may also include various kinds of setting information at the time of a print operation.

The MFP 300 receives this request information in step S2502, and temporarily stores it in the RAM 904 (or the nonvolatile memory 905). Then, the MFP 300 determines using a role reversal determination unit whether or not to make a communication role reversal (role change). The role reversal determination unit is implemented by the CPU 902 of the MFP 300 when the CPU 902 executes an application stored in the miscellaneous 1308 in the RAM 904 of the MFP 300. Control in the role reversal determination unit will be described later, and in this case, assume that the MFP 300 determines that the role reversal is to be made, and consequently generates a post-reversal communication identifier required to secure the security at the time of re-communications (to be described later). The post-reversal communication identifier is a 16-byte random number. However, the present invention is not limited to this, the post-reversal communication identifier may be a unique numerical value or character string. For example, the post-reversal communication identifier may be a 10-byte random number identifier NFC ID3i notified in step S2101 in FIG. 21.

In step S2503, the MFP 300 sends role request information to the mobile communication terminal apparatus 200 as a response to the request in step S2501. This role request information includes a communication role reversal request and the post-reversal communication identifier.

After the mobile communication terminal apparatus 200 identifies the communication role reversal request using an approach advisability determination unit, it stores the post-reversal communication identifier in the RAM or the like, and determines to close the current communications in the first session so as to reverse a communication role. The approach advisability determination unit is implemented by the CPU 802 which executes an application stored in the unique application 1706 in the mobile communication terminal apparatus mobile communication terminal apparatus 200. Steps S2106 and S2107 required to close the communications in the first session are the same as those in FIG. 21, and the mobile communication terminal apparatus 200 and MFP 300 return to an initial state. However, in case of FIG. 25, since the MFP 300 sends the role change request to the mobile communication terminal apparatus 200 in step S2503, the release request from the mobile terminal in step S2106 represents a request agreement (role change allowed) with the role change.

According to the aforementioned exchange, the mobile communication terminal apparatus 200 serves as a target, the MFP 300 serves as an initiator, the NFC units included in these apparatuses are re-activated in the passive mode, and communications in a second session are re-established. That is, the NFC unit 818 of the mobile communication terminal apparatus 200 operates based on an electromotive force caused by electromagnetic induction of an RF field generated by the NFC unit 918 included in the MFP 300, and at least the NFC unit 818 can be excluded from loads which consume electric power of a battery (not shown) of the mobile terminal 200. That is, the mobile communication terminal apparatus 200 can make the NFC communications using the electromotive force generated by the electromagnetic induction without supplying any electric power from a power supply such as a battery to the NFC unit 818.

Steps S2001 to S2005 are the same as those in FIG. 20, and the MFP 300 and mobile communication terminal apparatus 200 are ready to exchange data. In step S2504, the MFP 300 notifies the mobile communication terminal apparatus 200 of a data reception approach. In this case, the MFP 300 notifies the mobile communication terminal apparatus 200 of the post-reversal communication identifier generated in step S2503 and the data name, data type, and data storage location received in step S2501 together.

In step S2505, the approach advisability determination unit of the mobile communication terminal apparatus 200 determines the advisability of the data reception approach. If the approach advisability determination unit confirms that the post-reversal communication identifier stored in step S2503 is the same as that received in step S2504, and data which matches the notified information associated with the data is stored, the approach advisability determination unit determines to permit the data reception approach. If the sameness of the post-reversal communication identifiers or storage of the designated data cannot be confirmed, the approach advisability determination unit determines to deny the approach. By confirming the sameness of the post-reversal communication identifiers, communication errors can be prevented, and by confirming storage of the designated data, unnecessary communications can be avoided.

In step S2506, the mobile communication terminal apparatus 200 returns a permission response as the determination result in step S2505 to the MFP 300. If the mobile communication terminal apparatus 200 returns a denial response, the process may return to step S2504, and the mobile terminal may expect to be notified of a correct post-reversal communication identifier or may behave as a normal target.

Upon reception of the permission response, in step S2507, the MFP 300 notifies the mobile communication terminal apparatus 200 of a data reception request (a file name with a path) with reference to the initial request information of the mobile communication terminal apparatus 200 which is stored in the RAM 904. In this case, the work memory 1302 in the RAM 904 of the MFP 300, which memory is used to store received data, is used as a ring buffer, and a data size within a free space range is sequentially designated, thereby divisionally receiving the reception data.

In step S2508, the mobile communication terminal apparatus 200 responds the designated data to the MFP 300 by dividing it into designated sizes according to the data reception request in step S2507. Since this response is sent by load modulation, the NFC unit 818 of the mobile communication terminal apparatus 200 does not consume any electric power.

Steps S2507 and S2508 are repeated until the data transfer is complete, and after completion of the data transfer, the communications are closed. When the MFP 300 receives a plurality of data, it notifies information associated with the plurality of data scheduled to be received at the timing of step S2504, but it may designate data to be received every time step S2507 is executed.

Steps S2007 and S2008 required to close the communications are the same as those in FIG. 20, and the mobile communication terminal apparatus 200 and MFP 300 return to an initial state. The data transferred in step S2508 in FIG. 25 is sent to the image memory 906 as needed, and is printed via the data conversion unit 907 and printing control unit 916.

FIG. 26 is a flowchart showing the determination sequence (step S2502) of the role reversal determination unit which functions when it is executed by the CPU 902 of the MFP 300.

In step S2601, the role reversal determination unit acquires information associated with target data, and the process advances to step S2602. The role reversal determination unit determines in step S2602 based on the acquired data type whether or not the target data is usable (interpretable) in the MFP 300. If the target data is usable, the process advances to step S2603; otherwise, the process advances to step S2604. Note that whether or not a data type is printable in the MFP 300 is determined by determining whether or not the data type is of an image file. Different determination processes may be executed depending on the application purpose of the MFP 300. For example, when the MFP 300 incorporates a mail sending function, and that data is attached to a mail message, the data type need not be considered.

The role reversal determination unit determines in step S2603 based on the acquired data size whether or not the target data can be acquired by the MFP 300. When the work memory 1302 of the MFP 300 is used as a ring buffer, this determination process may be skipped. However, when full data has to be stored in the work memory 1302, if the data size is larger than a free space of the work memory 1302, the role reversal determination unit determines that the MFP 300 cannot acquire the target data. If the communication role can be reversed, the process advances to step S2605; otherwise, the process advances to step S2604.

In step S2604, the role reversal determination unit determines that the roles are not reversed, and the process advances to step S2606. In step S2605, the role reversal determination unit determines that the roles are reversed, and the process advances to step S2607.

In step S2606, the role reversal determination unit generates a reversal disapproval reason, and ends the determination sequence. When the role reversal determination unit determines that the roles are not reversed, unnecessary data transfer can be avoided. Also, since the role reversal determination unit generates the reversal disapproval reason, it can notify the mobile communication terminal apparatus 200 of the reason in step S2503. As a result, the mobile communication terminal apparatus 200 can determine whether to re-try or abort the request.

In step S2607, a 16-byte random number character string is generated as the post-reversal communication identifier, thus ending the determination sequence.

As can be seen from the above description, the power consumption of the mobile communication terminal apparatus 200, which is basically driven by a battery, can be suppressed. In step S2507 and subsequent steps, even when the power supply of the mobile communication terminal apparatus 200 is OFF, data exchange via the NFC communications can be executed.

The description of this embodiment has been given using the example in which data to be exchanged is stored in the user designation data 1805 in the mobile communication terminal apparatus 200. However, the present invention is not limited to this. For example, the unique application 1706 in the mobile communication terminal apparatus 200 may be configured to return data to the MFP 300 as needed by storing an entity of data in the image processing buffer 1603 in the mobile communication terminal apparatus 200 or the server apparatus 101, and using the user designation data 1805 as a ring buffer. In this case, for example, in the processes of steps S2507 and S2508, the mobile communication terminal apparatus 200 sends data specifying information (for example, file path information or URI) required to specify the entity of the data to be processed to the MFP 300 via a wireless communication. At this time, electric power is consumed to run the unique application 1706 in steps S2507 and S2508. However, since the NFC unit 818 does not consume any electric power, power consumption can be suppressed compared to the case in which the mobile communication terminal apparatus 200 operates as an initiator.

Second Embodiment

Some of pieces of information exchanged by the data exchange in the first embodiment may be implemented by managing an RFU (Reserved for Future Use) area of an NFC protocol.

The second embodiment will explain an example in which a communication role reversal request in step S2503 is notified using an RFU area of a PFB byte of a data transfer protocol specified by the NFC standard, so as to be focused on differences from the first embodiment.

Figures 27A, 27B:
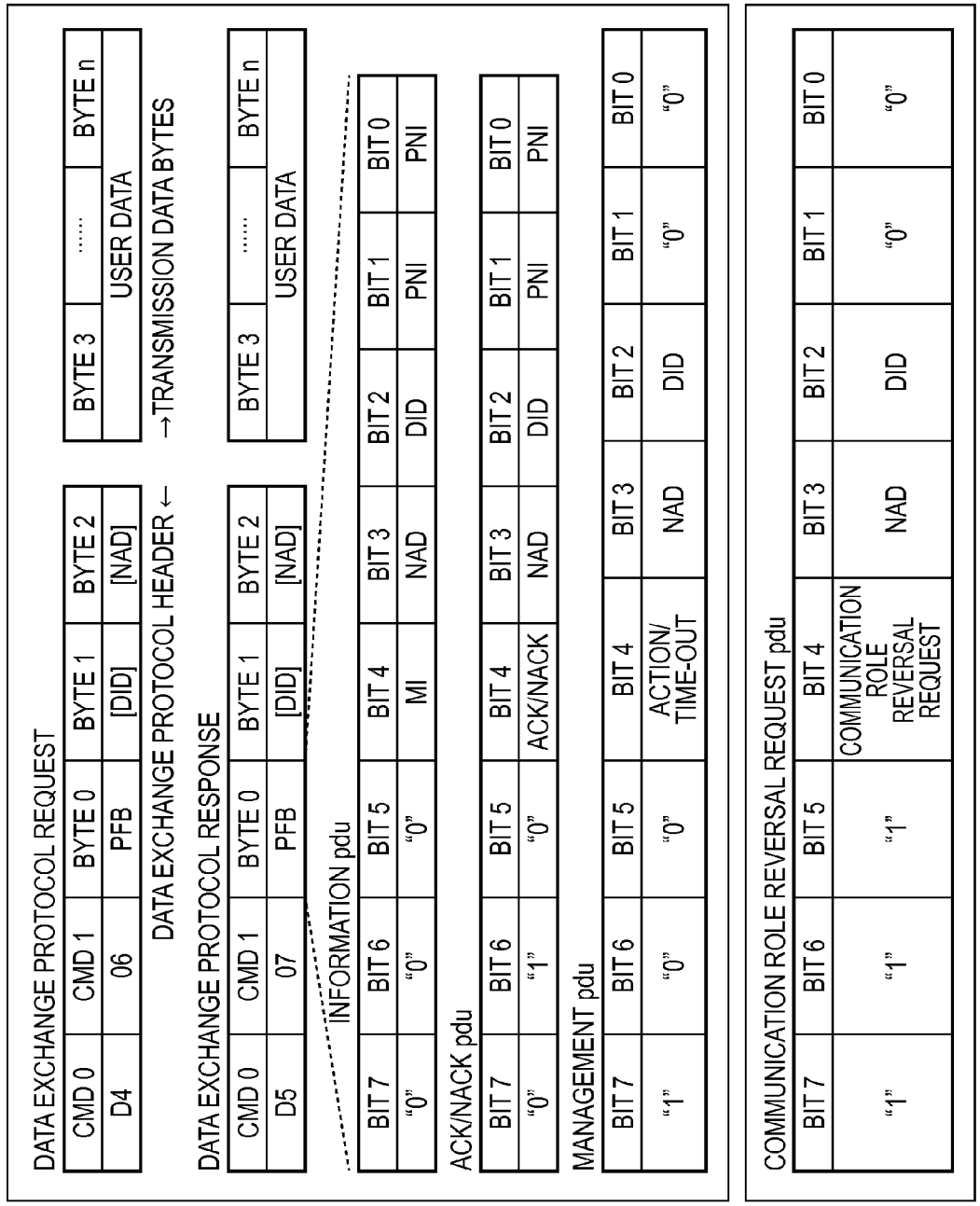
FIGS. 27A and 27B are views showing the packet configuration for an NFC protocol and RFU area management according to the second embodiment.

FIGS. 27A and 27B are views for explaining the NFC data transfer protocol and RFU area management. FIG. 27A shows the definition of the NFC data exchange protocol, and FIG. 27B shows an RFU area management example according to this embodiment.

CMD0 has to designate D4 in case of a request from an initiator and D5 in case of a response from a target. Byte 0 is a PFB byte, and its definition and RFU area management will be described later. Byte 1 and byte 2 are indispensable data bytes specified by the NFC standard, and CMD0 to byte 2 are specified as a data exchange protocol header. Byte 3 to byte n are specified as transfer data bytes, and are user data bytes which can be arbitrarily used by the NFC application. Steps S2501, S2503, S2504, and S2506 to S2508 in the first embodiment use the user data bytes.

The PFB byte is a byte used to transfer request information of transfer control. As shown in FIG. 27A, the PFB byte defines three types of information, that is, information pdu, ACK/NACK pdu, and management pdu by combinations of values of bits 7 to 5, and other kinds of information are specified as the RFU areas. The second embodiment defines and applies a communication role reversal request pdu in which bits 7 to 5 are set to all 1s of the RFU area, as shown in FIG. 27B.

Exchange of commands between the MFP 300 and mobile communication terminal apparatus 200 according to the second embodiment will be described below with reference to FIG. 25.

Steps S2101 and S2502 are the same as those in the first embodiment, and a role reversal determination unit determines that roles are to be reversed, and a post-reversal communication identifier is generated in this state.

In step S2503, the MFP 300 responds a communication role reversal request to the mobile communication terminal apparatus 200 using the communication role reversal request pdu shown in FIG. 27B. In this case, the user data bytes do not store any information indicating a communication role reversal request, and store only the post-reversal communication identifier. When the mobile communication terminal apparatus 200 identifies the communication role reversal request pdu, it stores the post-reversal communication identifier using an approach advisability determination unit as in the first embodiment. Subsequently, steps S2106 to S2008 are the same as those in the first embodiment. After completion of data reception by the MFP 300, a series of communication and print processes end.

As described above, control associated with the communication role reversal request in the unique application 1706 in the mobile communication terminal apparatus 200 and an application stored in the miscellaneous 1308 in the RAM 904 of the MFP 300 can be simplified. Note that the RFU area management is not limited to the above application, but various applications are available. For example, it is assumed that the RFU area is used in association with data exchange which can have specific meanings in terms of management of the NFC communications (for example, a data sending request in step S2501 and a data reception approach in step S2504).

Note that in the second embodiment, the RFU area of the RFB byte of the data transfer protocol is used. However, the RFU area to be used is not limited to the data transfer protocol. For example, the RFU area is defined in a BSi byte and BRi byte in an attribute request in step S2101 and also in a DRi byte and DSi byte in a parameter selection request in step S2103. It is assumed that the mobile communication terminal apparatus 200 inquires the MFP 300 as to whether or not to allow a role reversal by managing the RFU areas of these bytes.

Likewise, it is assumed that the MFP 300 sends a response about the presence/absence of a role reversal capability to the mobile communication terminal apparatus 200 by managing the RFU area of a TO byte in an attribute response in step S2102.

Third Embodiment

Some of pieces of information exchanged by the data exchange in the first embodiment may be implemented by extending the NFC protocol.

The third embodiment will explain an example in which a release request in step S2106 and a release response in step S2107 are implemented by extending the definition of a protocol command byte CMD1 specified by the NFC standard, so as to be focused on differences from the first embodiment.

FIGS. 28A and 28B are views for explaining the packet configurations of a release request and release response in the NFC protocol. FIG. 28A shows the definition of the NFC protocol, and FIG. 28B shows an extended example according to the third embodiment. CMD0 has to designate D4 in case of a request from an initiator, and D5 in case of a response from a target. Byte 0 is an indispensable data byte specified by the NFC standard. It is specified that CMD1 has to designate 0A in case of a release request, and 0B in case of a release response, but 0C to FF are not specified. In the present invention, a post-release role reversal request is defined as 0C and a post-release role reversal response is defined as 0D.

Figure 29:
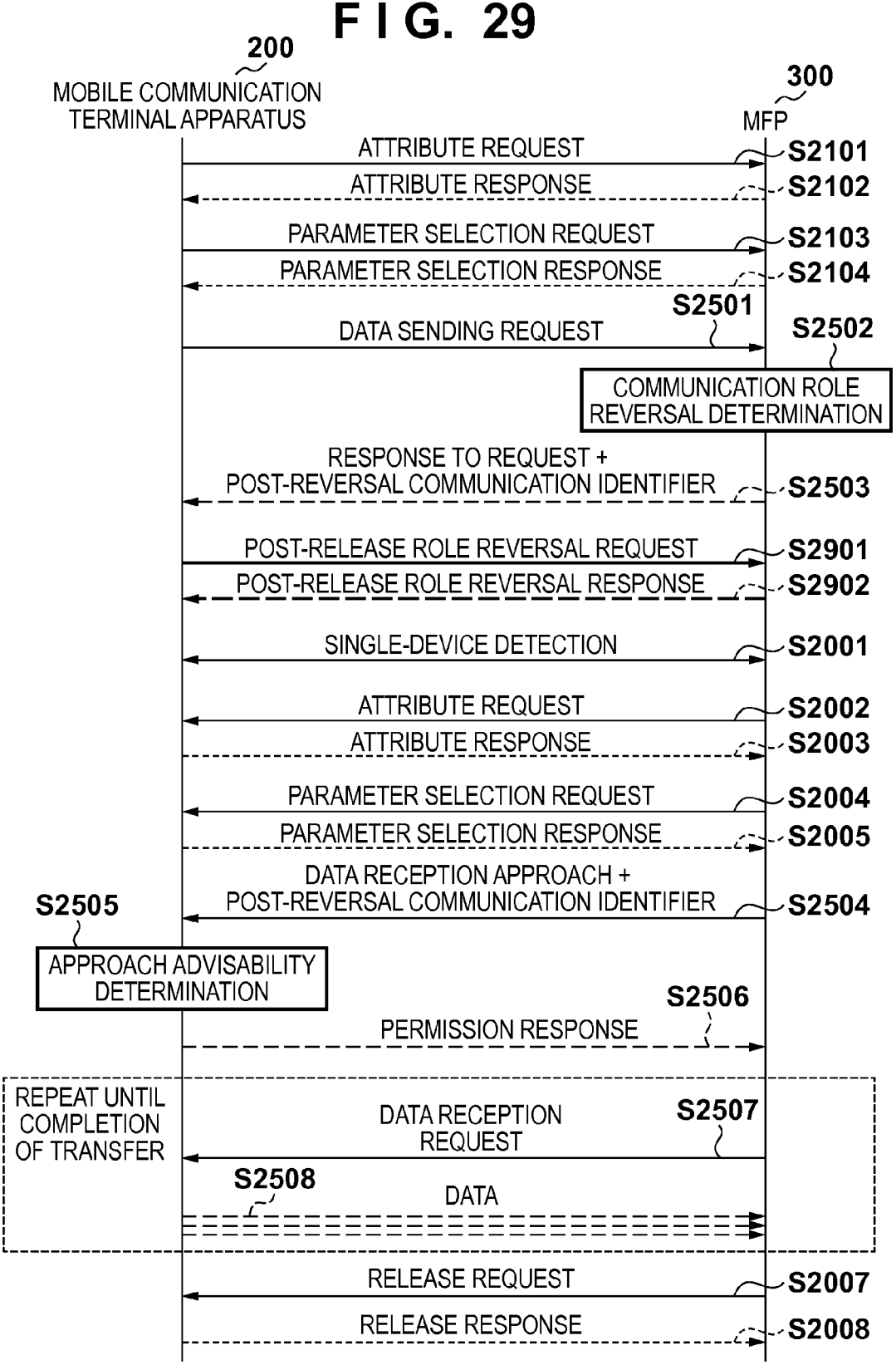
FIG. 29 is a flowchart for explaining exchange of commands between an MFP and mobile communication terminal apparatus according to the third embodiment.

FIG. 29 is a flowchart for explaining exchange of commands between the MFP 300 and mobile communication terminal apparatus 200 according to the third embodiment. In the following description, the same step numbers denote the same processes as in FIG. 25 above. Steps S2101 to S2503 are the same as those in FIG. 25, and an approach advisability determination unit of the mobile communication terminal apparatus 200 identifies a communication role reversal request and stores a post-reversal communication identifier in this state.

Subsequently, in step S2901, the mobile communication terminal apparatus 200 notifies the MFP 300 of a post-release role reversal request. This request explicitly instructs the MFP 300 as a target to reverse its role in the subsequent communication, that is, to start communications as an initiator.

After that, in step S2902, the MFP 300 notifies the mobile communication terminal apparatus 200 of a post-release role reversal response. With this response, the mobile communication terminal apparatus 200 can confirm that the MFP 300 has recognized the communication role reversal, and the apparatus 200 itself serves as a target in the subsequent communications.

Subsequently, steps S2001 to S2008 are the same as those in FIG. 25, and after completion of data reception by the MFP 300, a series of communication and print processes end.

As described above, control associated with the communication role reversal before and after the release processing in the unique application 1706 in the mobile communication terminal apparatus 200 and the application stored in the miscellaneous 1308 in the RAM 904 of the MFP 300 can be simplified.

Fourth Embodiment

In the first to third embodiments described above, before sending of print data is started, the roles of the initiator and target are reversed. Alternatively, the roles may be reversed in the middle of data exchange. The fourth embodiment will explain an example in which the communication roles are reversed according to the battery remaining amount of the mobile communication terminal apparatus 200, so as to be focused on differences from the first embodiment.

Figure 30:
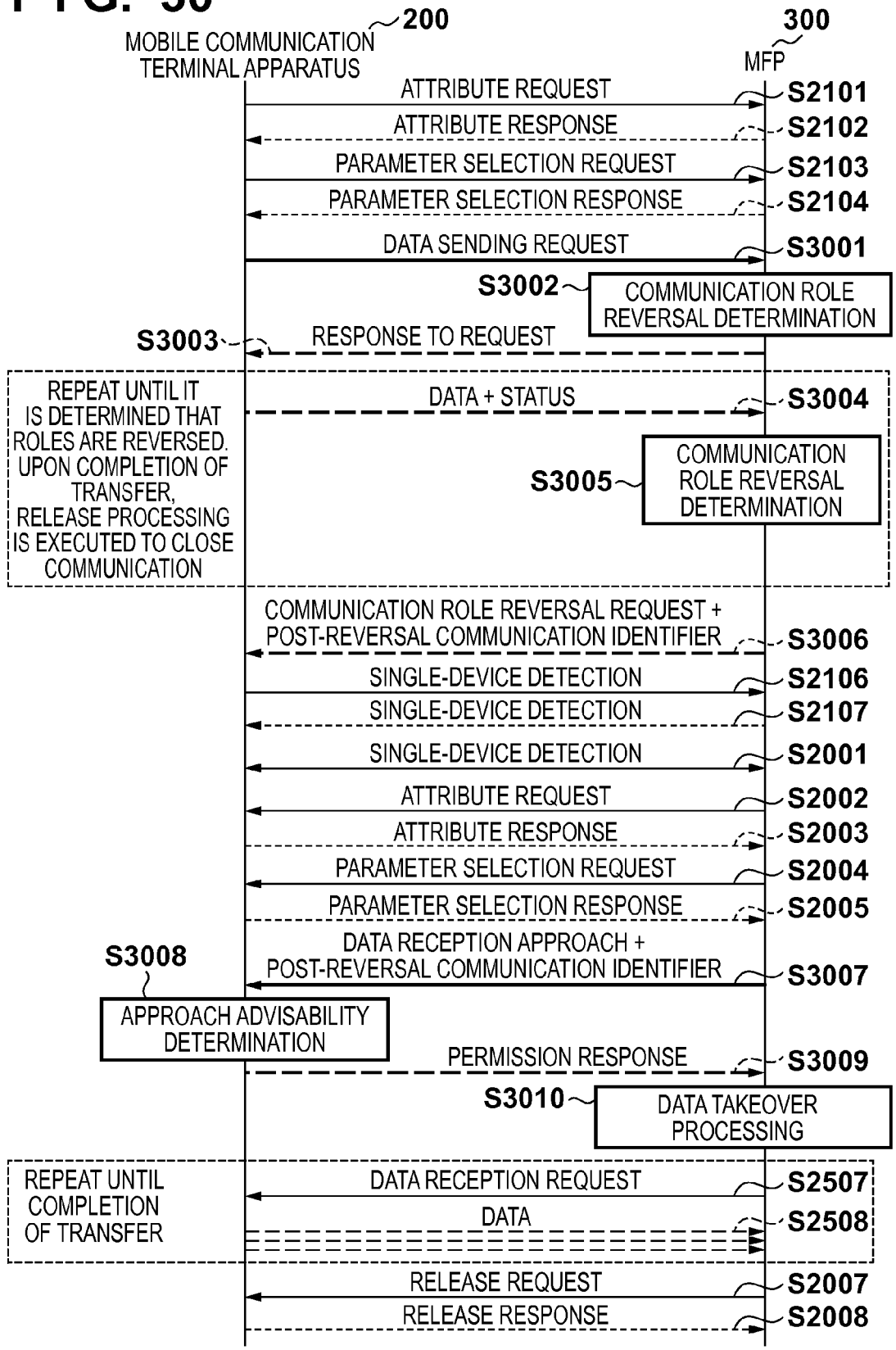
FIG. 30 is a flowchart for explaining exchange of commands between an MFP and mobile communication terminal apparatus according to the fourth embodiment.

FIG. 30 is a flowchart for explaining exchange of commands between the MFP 300 and mobile communication terminal apparatus 200 according to the fourth embodiment. The same step numbers denote the same processes as in FIG. 25 above.

Steps S2101 to S2104 are the same as those in FIG. 25, and the mobile communication terminal apparatus 200 serves as an initiator to allow data exchange with the MFP 300 in the active mode.

In step S3001, the mobile communication terminal apparatus 200 issues a data sending request to the MFP 300. In this case, in addition to step S2501, the mobile communication terminal apparatus 200 notifies the MFP 300 of its battery remaining amount. The battery remaining amount is numerical value information which is acquired by an application stored in the unique application 1706 in the mobile communication terminal apparatus 200 from the power supply unit 814 in the mobile communication terminal apparatus 200, and is a numerical value of percentages indicating a ratio of the battery remaining amount to a battery capacity.

A role reversal determination unit in the MFP 300 determines in step S3002 whether or not to reverse communication roles. In addition to the determination process of step S2502, the role reversal determination unit determines based on the battery remaining amount of the mobile communication terminal apparatus 200 whether or not to reverse the communication roles. Assume that the battery remaining amount is sufficient, that is, 70%, and the role reversal determination unit determines that the communication roles are not reversed.

In step S3003, the MFP 300 responds a data sending OK message to the mobile communication terminal apparatus 200. In step S3004, the mobile communication terminal apparatus 200 divides data into several blocks, and sends them in turn. In this case, the mobile communication terminal apparatus 200 notifies the MFP 300 of the battery remaining amount at that time together. Note that a unit of division may be an arbitrary unit, and follows a value designated in advance by the unique application 1706. In step S3005, the MFP 300 receives the data, and executes the same processing as in step S3502. Steps S3004 and S3005 are sequentially repeated, and the battery remaining amount of the mobile communication terminal apparatus 200 gradually lowers to reach 30% (low battery remaining amount state) sooner or later. Then, in step S3005, the role reversal determination unit determines that the roles are to be reversed, and generates a post-reversal communication identifier. After that the process advances to step S3006.

In step S3006, the MFP 300 notifies the mobile communication terminal apparatus 200 of a communication role reversal request and the post-reversal communication identifier. At this time, the MFP 300 holds already received data, and manages them to be combined with data to be received in subsequent communications. Likewise, the mobile communication terminal apparatus 200 holds data to be sent, and manages them to be continuously used in the subsequent communications.

Steps S2106 to S2005 are the same as those in FIG. 25, and after the communications of the mobile communication terminal apparatus 200 are closed, the MFP 300 serves as a target to allow data exchange with the mobile communication terminal apparatus 200 in the passive mode.

In step S3007, the MFP 300 notifies the mobile communication terminal apparatus 200 of a data reception approach. In this case, the MFP 300 notifies the mobile communication terminal apparatus 200 of the post-reversal communication identifier generated in step S3005 and a data name, data type, and a data storage location received in step S3001 together. In step S3008, an approach advisability determination unit of the mobile communication terminal apparatus 200 determines the advisability of the data reception approach. If the approach advisability determination unit confirms that the post-reversal communication identifier stored in step S2503 is the same as that received in step S2504, and data to be transmitted which match notified information associated with data are stored, the approach advisability determination unit determines that the data reception approach is permitted. If the sameness of the post-reversal communication identifiers or storage of the designated data cannot be confirmed, the approach advisability determination unit determines to deny the approach. In step S3009, the mobile communication terminal apparatus 200 responds a permission response as the determination result in step S3008 to the MFP 300. If the mobile terminal returns a denial response, the process may return to step S3007, and the mobile terminal may expect to be notified of a correct post-reversal communication identifier or may behave as a normal target. In step S3010, the MFP 300 executes data takeover processing for combining data to be received after those received until step S3004. When the data transfer is executed for respective blocks, data may be combined for respective blocks.

After that, steps S2106 to S2008 are the same as those in FIG. 25, and after completion of the data reception by the MFP 300, a series of communication and print processes end.

In this manner, since the data transfer can be partially attained by communications in the active mode with a higher transfer rate than the passive mode while avoiding a battery dead state of the mobile communication terminal apparatus 200, a required time until completion of the data transfer can be shortened.

Note that in the fourth embodiment, the mobile communication terminal apparatus 200 sequentially notifies the MFP 300 of the battery remaining amount in step S3004. However, the acquisition method of the battery remaining amount of the mobile communication terminal apparatus 200 by the MFP 300 is not limited to this. For example, independently of the data sending in step S3004, only when the battery remaining amount of the mobile communication terminal apparatus 200 falls below a given threshold, the mobile communication terminal apparatus 200 may notify that message. Also, notification means of the battery remaining amount and communication role request may use the user data or the RFU area management or extension of the NFC protocol, as has been described in the aforementioned embodiments.

Fifth Embodiment

The aforementioned embodiments have explained the case in which data of the mobile communication terminal apparatus 200 is printed using the MFP 300. Alternatively, data obtained by scanning a document by the MFP 300 may be stored in the mobile communication terminal apparatus 200.

An example in which scan data according to a free space of the user designation data 1805 of the mobile communication terminal apparatus 200 is sent will be described below so as to be focused on differences from the first embodiment.

Figure 31:
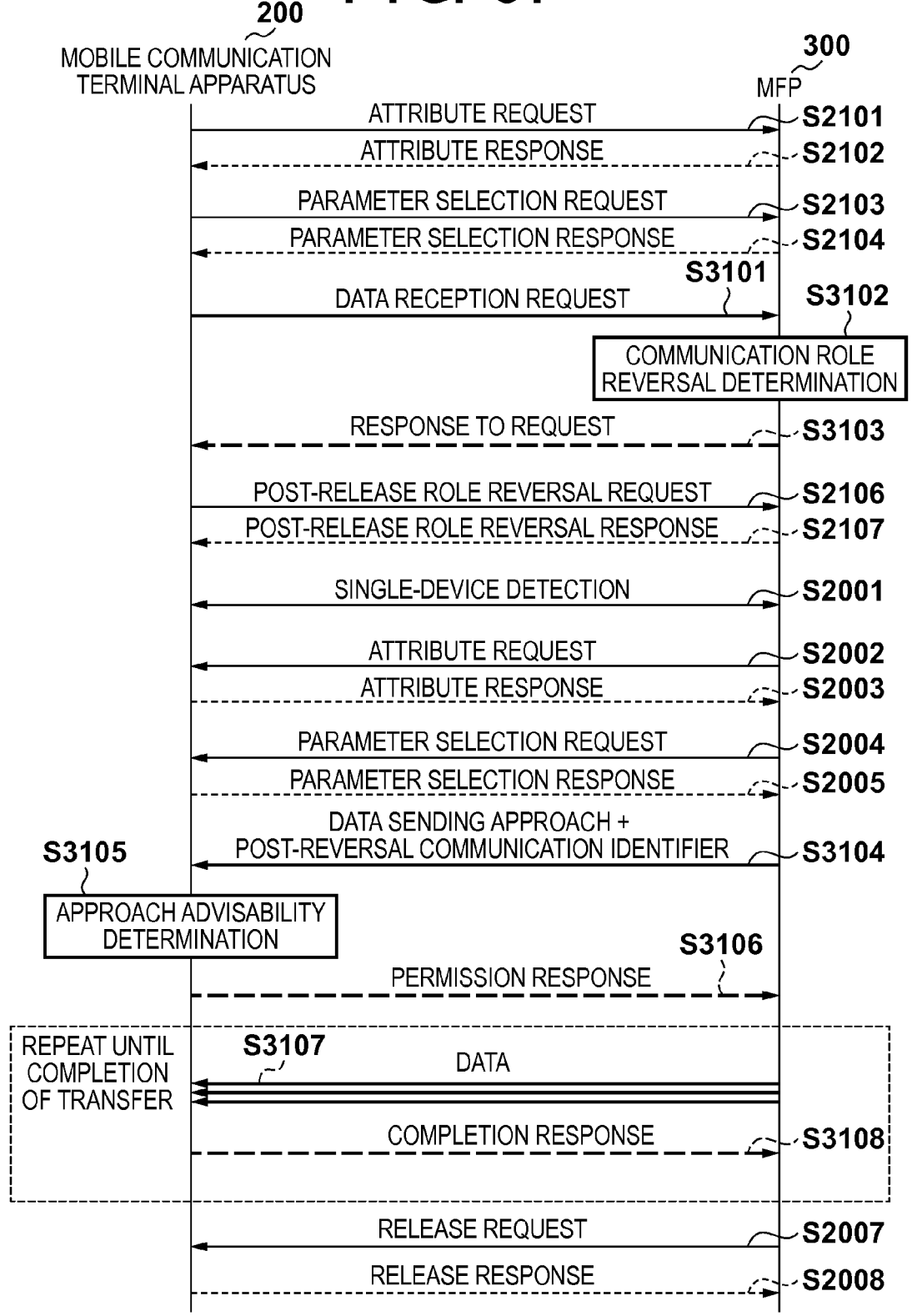
FIG. 31 is a flowchart for explaining exchange of commands between an MFP and mobile communication terminal apparatus according to the fifth embodiment.

FIG. 31 is a sequence chart for explaining exchange of commands between the MFP 300 and mobile communication terminal apparatus 200 according to this embodiment. In the following description, the same step numbers denote the same processes as those in FIG. 25.

Steps S2101 to S2104 are the same as those in FIG. 25, and the mobile communication terminal apparatus 200 serves as an initiator to allow data exchange with the MFP 300.

In step S3101, the mobile communication terminal apparatus 200 notifies the MFP 300 of a data reception request. This request requests to scan a document placed on the platen 301 of the MFP 300 and to send scan data to the mobile communication terminal apparatus 200. In this case, the mobile communication terminal apparatus 200 notifies the MFP 300 of a free space of the user designation data 1805 in the mobile communication terminal apparatus 200 as a memory capacity for scan data reception.

A role reversal determination unit in the MFP 300 determines in step S3102 whether or not communication roles are to be reversed. Control in the role reversal determination unit will be described later, and assume that the role reversal determination unit determines that the roles are to be reversed, and consequently generates a post-reversal communication identifier in this case.

In step S3103, the MFP 300 responds a communication role reversal request and the post-reversal communication identifier to the mobile communication terminal apparatus 200 as a response to the request in step S3101 in the same manner as in step S2503. When an approach advisability determination unit of the mobile communication terminal apparatus 200 identifies the communication role reversal request, it stores the post-reversal communication identifier, and determines that the current communications are closed to reverse the communication roles.

Steps S2106 to S2005 are the same as those in FIG. 25, and after the communications of the mobile communication terminal apparatus 200 are closed, the MFP 300 serves as a target to allow data exchange with the mobile communication terminal apparatus 200 in the passive mode.

The MFP 300 scans a document placed on the platen 301 via the scanning unit 910 and stores scan data in the image memory 906 in accordance with an instruction of the scanning control unit 908.

In step S3104, the MFP 300 which has stored the scan data notifies the mobile communication terminal apparatus 200 of a data sending approach. In this case, the MFP 300 notifies the mobile communication terminal apparatus 200 of the post-reversal communication identifier generated in step S3102 and a scan name, scan data size, and scan data type together.

An approach advisability determination unit in the mobile communication terminal apparatus 200 determines the advisability of the data sending approach in step S3105. The approach advisability determination unit confirms that the post-reversal communication identifier stored in step S3103 is the same as that received in step S3104, and determines that the data sending approach is permitted; otherwise, it determines that the approach is denied.

In step S3106, the mobile communication terminal apparatus 200 responds a permission response to the MFP 300 as the determination result in step S3105. When the mobile terminal returns a denial response, the process returns to step S3104, and the mobile terminal may expect to be notified of a correct post-reversal communication identifier or may behave as a normal target.

In step S3107, the MFP 300, which received the permission response, starts data sending to the mobile communication terminal apparatus 200.

In step S3108, upon completion of reception processing of data sent from the MFP 300, the mobile communication terminal apparatus 200 returns a completion response.

Steps S3107 and S3108 may be repeated as needed until data transfer is completed. For example, when scan data is transferred while being divided into arbitrary blocks, steps S3107 and S3108 are repeated for each block.

After that, steps S2007 and S2008 are the same as those in FIG. 25, and a series of communications are closed.

FIG. 32 is a flowchart showing the determination sequence of the role reversal determination unit in step S3102.

In step S3201, the role reversal determination unit acquires a data size of data to be scanned and a memory capacity as information associated with target data. A size of a document placed on the platen 301 is identified by executing a pre-scan, and the data size of the data to be scanned is calculated in consideration of the identified size and a scan resolution. In this embodiment, two different data sizes for 300 dpi as a normal scan resolution and 240 dpi for a small-capacity scan resolution are calculated. The memory capacity uses information notified in step S3101. After that, the process advances to step S3202.

In step S3202, the role reversal determination unit compares the scan data size at the normal scan resolution with the memory capacity. If the data size is larger than the memory capacity, the process advances to step S3203; otherwise, the process advances to step S3204.

The role reversal determination unit determines in step S3203 whether or not the data size is excessively large. If the data size at the small-capacity scan resolution is larger than the memory capacity, the role reversal determination unit determines that the data size is "excessively large", and the process advances to step S3205; otherwise, the process advances to step S3206.

In step S3204, the role reversal determination unit determines that the roles are to be reversed, and the process advances to step S3206. In step S3205, the role reversal determination unit determines that the roles are not to be reversed, and the process advances to step S3208.

In step S3206, the role reversal determination unit compresses the scan data. As described above, the role reversal determination unit decides that the scan data is to be generated at the small-capacity scan resolution. In step S3207, the role reversal determination unit generates a post-reversal communication identifier, thus ending the determination sequence. In step S3208, the role reversal determination unit generates a reversal denial reason, thus ending the determination sequence. The mobile communication terminal apparatus 200, which is notified of the reversal denial reason in step S3103, can decide a measure to be taken (for example, it aborts the scan processing, or a document is scanned at a still lower scan resolution). After that, the scan data is generated using the normal scan resolution when the role reversal determination unit does not decide in step S3206 that the small-capacity scan resolution is used.

In this manner, the data transfer can be realized in consideration of the state and capability of the mobile communication terminal apparatus 200. When the scan processing is continued while the memory capacity for scan data reception of the mobile communication terminal apparatus 200 is insufficient, a communication error may occur or electric power required to execute ring buffer processing for data reception in the mobile communication terminal apparatus 200 has to be consumed. This embodiment can avoid them.

Note that in the fifth embodiment, scan data to be generated is changed using the free space information of the user designation data 1805 of the mobile communication terminal apparatus 200. However, the free space as a criterion is not limited to this. For example, when an entity of data is stored in the image processing buffer 1603 in the mobile communication terminal apparatus 200 or the server apparatus 101, their free space information can be used.

This embodiment has explained the scan data. However, data that can be handled by the present invention is not limited to this. For example, data in a memory card (not shown in FIG. 9) inserted in the MFP 300 may be used. In this case, pieces of information are exchanged before step S3101, and a list of pieces of data information in a CF card is transferred to the mobile communication terminal apparatus 200, thus allowing the user to select and acquire arbitrary data. Also, the pre-scan processing described in step S3102 or the like is not required.

Furthermore, various improvements can be made based on this embodiment. For example, even when the mobile communication terminal apparatus 200 configures a ring buffer, and need not consider a memory capacity, when the data size is excessively large, it may be determined that the roles are not to be reversed. In this case, communications in the active mode with high data transfer efficiency can be made although electric power is consumed. This determination may be made by either the role reversal determination unit of the MFP 300 or the approach advisability determination unit of the mobile communication terminal apparatus 200. Also, as can be seen from the above embodiments, these pieces of information and determination result can be transferred using the user data of the data exchange or the RFU area management or extension of the NFC.

Sixth Embodiment

In the above embodiments, the MFP 300 issues the communication role reversal request. Alternatively, the mobile communication terminal apparatus 200 may issue that request.

The sixth embodiment will explain, using FIG. 25, exchange of commands between the MFP 300 and mobile communication terminal apparatus 200 in association with an example in which a communication role reversal request is issued at the timing of step S2501 to attain a power consumption reduction, so as to be focused on differences from the first embodiment.

Steps S2101 to S2104 are the same as those in the first embodiment, and NFC communications have been established to have the mobile communication terminal apparatus 200 as an initiator. In step S2501, the mobile communication terminal apparatus 200 issues a communication role reversal request to the MFP 300 using user data bytes (first embodiment) or a communication role reversal request pdu (second embodiment). In step S2502, upon reception of the request, the role reversal determination unit of the MFP 300 determines that the roles are to be reversed, and generates a post-reversal communication identifier. In step S2503, the MFP 300 responds a reversal OK message to the mobile communication terminal apparatus 200. After that, steps S2106 to S2008 are the same as those in the first embodiment, and after completion of the data reception by the MFP 300, a series of communication and print processes end.

In this manner, the roles can be reversed at the initiative of the mobile communication terminal apparatus 200 as the initiator at the beginning of the communication.

Seventh Embodiment

In the above embodiments, the mobile communication terminal apparatus 200 issues a release request. Alternatively, the MFP 300 may issue that request.

The seventh embodiment will explain, using FIG. 25, exchange of commands between the MFP 300 and mobile communication terminal apparatus 200 in association with an example in which release processing is demanded at the timing of step S2503, so as to be focused on differences from the first embodiment.

Steps S2101 to S2502 are the same as those in the first embodiment, and the role reversal determination unit determines that the roles are to be reversed, and generates a post-reversal communication identifier in this state.

In step S2503, the MFP 300 notifies the mobile communication terminal apparatus 200 of the post-reversal communication identifier of a communication reversal request, and also a release processing demand. In this case, a release processing request message is transferred using user data bytes (first embodiment) or a communication role reversal request pdu (second embodiment). In step S2106, the mobile communication terminal apparatus 200 notifies the MFP 300 of a release request in response to the release processing demand from the MFP 300. After that, steps S2107 to S2008 are the same as those in the first embodiment, and after completion of the data reception by the MFP 300, a series of communication and print processes end.

Thus, the release processing can be executed at the initiative of the MFP 300 as the target at the beginning of the communications.

As described in the above embodiments, after the mobile communication terminal apparatus communicates with an apparatus such as an MFP as an initiator, communication roles are reversed to have the mobile communication terminal apparatus as a target. In this manner, since electric power is supplied to the NFC unit 818 of the mobile communication terminal apparatus by communications with the initiator such as the MFP, communications can be appropriately made without supplying any electric power by the mobile communication terminal apparatus itself.

Note that the aforementioned embodiments have exemplified, as data to be transferred via the NFC, data to be printed by the MFP or that obtained by scanning a document by the MFP. However, the present invention is not limited to this, and various data may be transferred.

Other Embodiments

In the above embodiments, the description has been given under the assumption that the mobile communication terminal apparatus is a smartphone. However, since the present invention is applicable to a mobile terminal which has a short distance wireless communication function and is driven by a battery, and an apparatus which executes processing based on information from that mobile terminal or an apparatus which transmits information toward the mobile terminal and is operated using an external power supply, the present invention is not limited to the aforementioned embodiments. The mobile terminal is not particularly limited, and a mobile phone, digital camera, PDA, portable PC, and the like may be used. Especially, in case of a smartphone, PDA, or PC, since the mobile communication terminal apparatus 200 described in each of the above embodiments can be implemented by an application program to be executed by their internal processor, the scope of the present invention includes a computer program. Furthermore, since the computer program is normally stored in a computer-readable storage medium such as a CD-ROM, the scope of the present invention also includes that computer-readable storage medium. The number of computers (CPUs) used to execute the computer program is not limited to one, and the program of this embodiment may be collaboratively executed by a plurality of computers. Hardware such as a circuit which partially executes the program of the present invention may be provided, and the processing of the present invention can be implemented when that hardware and a computer such as a CPU cooperate with each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-048615, filed Mar. 5, 2012, which is hereby incorporated by reference herein in its entirety.

The invention claimed is:

1. An apparatus comprising:
a communication unit configured to execute a wireless communication with a device, by establishing a first session as a target with the device for receiving electromagnetic wave generated by the device or by establishing a second session as an initiator with the device for generating electromagnetic wave;
a first communication control unit configured to cause the communication unit to establish the first session and acquire a request for executing a predetermined process from the device by receiving electromagnetic wave which is generated in the established first session by the device; and
a second communication control unit configured to, in a case where the communication unit acquires the request by the first communication control unit, cause the communication unit to establish the second session and to execute a communication, corresponding to processing information for executing the predetermined process, with the device by generating electromagnetic wave for the communication in the second session,
wherein the communication unit receives, from the device, device specifying information required to specify the device, which sent the request, together with the request, and establishes the second session with the device specified based on the received device specifying information.

2. The apparatus according to claim 1, wherein the communication unit establishes the first session by receiving electromagnetic waves generated by the device which serves as the initiator.

3. The apparatus according to claim 1, wherein the communication unit establishes the second session by generating electromagnetic waves as the initiator.

4. The apparatus according to claim 1, wherein the communication unit acquires, from the device, data specifying information required to specify data to be processed together with the request, and receives, from the device, the data specified based on the acquired data specifying information as the processing information in the second session.

5. The apparatus according to claim 4, wherein the communication unit acquires, from the device, size information required to specify a data size of the data together with the specifying information, and when a data size specified based on the acquired size information is not more than a predetermined size, the communication unit receives the data.

6. The apparatus according to claim 4, further comprising a processing unit configured to execute the predetermined process to the received data.

7. The apparatus according to claim 1, wherein the communication unit receives data corresponding to the request from the device as the processing information in the second session.

8. The apparatus according to claim 1, wherein the wireless communication executed by the communication unit is NFC.

9. The apparatus according to claim 1, further comprising a determining unit configured to determine whether to cause the communication unit to execute the communication in the second session, based on a size or a type of the processing information to be received from the device,
wherein the size or the type is specified by information acquired in the first session,
and wherein the second communication control step causes the communication unit to execute the communication in the second session, in a case where the determining unit determines to cause the communication unit to execute the communication.

10. A non-transitory computer-readable storage medium storing a program for controlling a computer to execute respective steps of a method executed by a processor included in an apparatus which comprises a communication unit configured to execute a wireless communication with a device, by establishing a first session as a target with the device for receiving electromagnetic wave generated by the device or by establishing a second session as an initiator with the device for generating electromagnetic wave,
the method comprising steps of;

a first communication control step of causing the communication unit to establish the first session and acquire a request for executing a predetermined process from the device by receiving electromagnetic wave which is generated in the established first session by the device; and a second communication control step of, in a case where the communication unit acquires the request by the first communication control step, causing the communication unit to establish the second session and to execute a communication, corresponding to processing information for executing the predetermined process, with the device by generating electromagnetic wave for the communication in the second session, wherein the communication unit acquires, from the device, device specifying information required to specify the device which sent the request, together with the request, and establishes the second session with the device specified based on the received device specifying information.

11. A method executed by a processor included in an apparatus which comprises a communication unit configured to execute a wireless communication with a device, by establishing a first session as a target with the device for receiving electromagnetic wave generated by the device or by establishing a second session as an initiator with the device for generating electromagnetic wave, the method comprising steps of;

a first communication control step of causing the communication unit to establish the first session and acquire a request for executing a predetermined process from the device by receiving electromagnetic wave which is generated in the established first session by the device; and a second communication control step of, in a case where the communication unit acquires the request by the first communication control step, causing the communication unit to establish the second session and to execute a communication, corresponding to processing information for executing the predetermined process, with the device by generating electromagnetic wave for the communication in the second session, wherein the communication unit acquires, from the device, device specifying information required to specify the device which sent the request, together with the request, and establishes the second session with the device specified based on the received device specifying information.

12. The method according to claim 11, wherein the communication unit establishes the first session by receiving electromagnetic waves generated by the device which serves as the initiator.

13. The method according to claim 11, wherein the communication unit establishes the second session by generating electromagnetic waves as the initiator.

14. The method according to claim 11, wherein the communication unit acquires, from the device, data specifying information required to specify data to be processed together with the request, and receives, from the device, the data specified based on the acquired data specifying information as the processing information in the second session.

15. The method according to claim 14, wherein the communication unit acquires, from the device, size information required to specify a data size of the data together with the specifying information, and when a data size specified based on the acquired size information is not more than a predetermined size, the communication unit receives the data.

16. The method according to claim 14, further comprising a processing unit configured to execute the predetermined process to the received data.

17. The method according to claim 11, wherein the communication unit receives data corresponding to the request from the device as the processing information in the second session.

18. The method according to claim 17, further comprising;

a determining step of determining whether to cause the communication unit to execute the communication in the second session, based on a size or a type of the processing information to be received from the device, wherein the size or the type is specified by information acquired in the first session, and wherein the second communication control step causes the communication unit to execute the communication in the second session, in a case where the determining step determines to cause the communication unit to execute the communication.

19. The method according to claim 11, wherein the wireless communication executed by the communication unit is NFC.

20. A method executed by a processor included in an apparatus which comprises a communication unit configured to execute a wireless communication with a device, by establishing a first session as a target with the device for receiving electromagnetic wave generated by the device or by establishing a second session as an initiator with the device for generating electromagnetic wave, the method comprising steps of;

a first communication control step of causing the communication unit to establish the first session and acquire a request for executing a predetermined process from the device by receiving electromagnetic wave which is generated in the established first session by the device; and a second communication control step of, in a case where the communication unit acquires the request by the first communication control step, causing the communication unit to establish the second session and to execute a communication, corresponding to processing information for executing the predetermined process, with the device by generating electromagnetic wave for the communication in the second session, wherein the communication unit receives data corresponding to the request from the device as the processing information in the second session.

* * * * *